US 8,749,184 B2

(12) United States Patent
Atarashi et al.

(10) Patent No.: US 8,749,184 B2
(45) Date of Patent: Jun. 10, 2014

(54) CONTROL APPARATUS FOR ELECTRIC MOTOR

(75) Inventors: Hirofumi Atarashi, Wako (JP); Hitoshi Horikawa, Wako (JP); Toshiyuki Nishida, Wako (JP); Masato Kita, Tokorozawa (JP); Yoshie Kita, legal representative, Tokorozawa (JP)

(73) Assignee: Honda Motor Co., Ltd., Tokyo (JP)

( * ) Notice: Subject to any disclaimer, the term of this patent is extended or adjusted under 35 U.S.C. 154(b) by 402 days.

(21) Appl. No.: 13/203,671

(22) PCT Filed: Feb. 2, 2010

(86) PCT No.: PCT/JP2010/051430
§ 371 (c)(1),
(2), (4) Date: Dec. 27, 2011

(87) PCT Pub. No.: WO2010/100989
PCT Pub. Date: Sep. 10, 2010

(65) Prior Publication Data
US 2012/0242262 A1    Sep. 27, 2012

(30) Foreign Application Priority Data
Mar. 4, 2009    (JP) .................. P2009-050255

(51) Int. Cl.
*H02P 27/00*    (2006.01)
*H02P 1/00*    (2006.01)
*H02P 6/00*    (2006.01)
*H02P 27/04*    (2006.01)

(52) U.S. Cl.
USPC ............. 318/400.3; 318/139; 318/400.01; 318/504; 318/801; 318/805

(58) Field of Classification Search
USPC .......... 318/400.3, 139, 400.01, 504, 801, 805
See application file for complete search history.

(56) References Cited

U.S. PATENT DOCUMENTS 6,307,759 B1    10/2001    Inarida et al.
6,437,997 B1    8/2002    Inarida et al.
(Continued)

FOREIGN PATENT DOCUMENTS

CN    1830134 A    9/2006
EP    0 613 234 B1    11/2001
(Continued)

OTHER PUBLICATIONS

International Search Report of PCT/JP2010/051430, mailing date Apr. 27, 2010.
(Continued)

*Primary Examiner* — Eduardo Colon Santana
*Assistant Examiner* — Gabriel Agared
(74) *Attorney, Agent, or Firm* — Westerman, Hattori, Daniels & Adrian, LLP

(57) ABSTRACT

A control apparatus for an electric motor provided with a rotator having a permanent magnet and with a stator for generating a rotating magnetic field by an applied voltage and revolving the rotator includes: a rectangular wave inverter that applies a rectangular wave voltage onto the stator of the electric motor to drive the electric motor; a voltage converting section that raises or lowers an output voltage of a direct-current power supply and applies the voltage onto the rectangular wave inverter; an electrical angle acquiring section that acquires an electrical angle of the rotator of the electric motor; and an output voltage command generating section that generates a command for instructing the voltage converting section to output an electrical-angle synchronized voltage whose amplitude ripples in synchronization with a change of the electrical angle of the rotator acquired by the electrical angle acquiring section. In response to the command generated by the output voltage command generating section, the voltage converting section raises or lowers the output voltage of the direct-current power supply to a voltage indicated by the command and applies the voltage onto the rectangular wave inverter. This reduces a loss caused by a response delay of the electric motor.

12 Claims, 19 Drawing Sheets

(56) References Cited

U.S. PATENT DOCUMENTS

| | | |
|---|---|---|
| 6,541,939 B2 | 4/2003 | Kishibe et al. |
| 7,911,162 B2 | 3/2011 | Hanada |
| 8,174,221 B2 * | 5/2012 | Kaneko et al. ............ 318/400.09 |
| 2006/0119297 A1 | 6/2006 | Okamura et al. |
| 2009/0033258 A1 * | 2/2009 | Atarashi ..................... 318/400.3 |
| 2009/0108794 A1 * | 4/2009 | Ochiai et al. .................. 318/760 |
| 2009/0121669 A1 * | 5/2009 | Hanada ......................... 318/504 |
| 2009/0128069 A1 * | 5/2009 | Kaneko et al. ............ 318/400.09 |

FOREIGN PATENT DOCUMENTS

| | | |
|---|---|---|
| EP | 1 873 900 A1 | 1/2008 |
| JP | 2005-051894 A | 2/2005 |
| JP | 2007-181398 A | 7/2007 |
| JP | 2007-306658 A | 11/2007 |
| RU | 2141719 C1 | 11/1999 |
| RU | 2209502 C2 | 7/2003 |
| WO | 2007/129760 A1 | 11/2007 |

OTHER PUBLICATIONS

Chinese Office Action dated Sep. 24, 2013, issued in corresponding Chinese Patent Application No. 201080010095.5.

* cited by examiner

CONTROL APPARATUS FOR ELECTRIC MOTOR

TECHNICAL FIELD

The present invention relates to a control apparatus for an electric motor provided with a rotator having a permanent magnet and with a stator for generating a rotating magnetic field by an applied voltage and revolving the rotator.

BACKGROUND ART

FIG. 18 is a block diagram showing a control apparatus for an electric motor according to related art to the present invention. The control apparatus for the electric motor 10 shown in FIG. 18 has a resolver 101, a current sensor 103, a band pass filter (BPF) 105, a three-phase-dq conversion section 107, a current command calculating section 109, a d-axis current control section 111, a q-axis current control section 113, an rθ conversion section 115, an inverter (INV) 117, an angular velocity calculating section 119, a direct voltage command generating section 121, a DC-DC converter 123, an output voltage detecting section 125, and an inverter control method determining section 127. In the electric motor 10 shown in FIG. 18, electric power is supplied from the condenser 15 through the control apparatus. Here, the electric motor 10 is, for example, a three-phase brushless DC electric motor provided with a rotator having a permanent magnet and with a stator for generating a rotating magnetic field by the applied three-phase voltages and thereby revolving the rotator.

The resolver 101 detects a mechanical angle of the rotator of the electric motor 10, and outputs an electrical angle θm corresponding to the detected mechanical angle. The electrical angle θm outputted from the resolver 101 is transmitted to the three-phase-dq conversion section 107 and the angular velocity calculating section 119. The current sensor 103 detects each phase current of the three-phase currents outputted from the inverter 117 and supplied to the stator of the electric motor 10.

The BPF 105 removes unnecessary components in the current detection signals indicating the three-phase alternating currents Iu, Iv, and Iw detected by the current sensor 103. The three-phase-dq conversion section 107 performs three-phase-dq conversion based on the current detection signals in which unnecessary components have been removed by the BPF 105 and the electrical angle θm of the rotator detected by the resolver 101, so as to calculate a detected value Id_s of the d-axis current and a detected value Iq_s of the q-axis current.

Based on a torque command value T inputted from the outside, the current command calculating section 109 determines a command value Id* for a current (a "d-axis current", hereinafter) to be supplied to the stator (a "d-axis stator", hereinafter) on the d-axis side and a command value Iq* for a current (a "q-axis current", hereinafter) to be supplied to the stator (a "q-axis stator", hereinafter) on the q-axis side. The command value Id* for the d-axis current is inputted to the d-axis current control section 111. Further, the command value Iq* for the q-axis current is inputted to the q-axis current control section 113. Here, the d-axis is the field axis, and the q-axis is the torque axis.

The d-axis current control section 111 determines the command value Vd** for a terminal-to-terminal voltage (a "d-axis voltage", hereinafter) for the d-axis stator such that the deviation ΔId between the command value Id* and the detected value Id_s for the d-axis current should decrease. The q-axis current control section 113 determines the command value Vq** for a terminal-to-terminal voltage (a "q-axis voltage", hereinafter) for the q-axis stator such that the deviation ΔIq between the command value Iq* and the detected value Iq_s for the q-axis current should decrease. The command value Vd for d-axis voltage and the command value Vq for the q-axis voltage are inputted to the rθ conversion section 115 and the inverter control method determining section 127.

The rθ conversion section 115 converts the command value Vd for the d-axis voltage and the command value Vq for the q-axis voltage into components of a voltage level V1 and an angle θ.

Based on the components of the voltage level V1 and the angle θ inputted from the rθ conversion section 115, the inverter 117 converts the direct voltage from the condenser 15 through the DC-DC converter 123, into alternating voltages of three phases (U, V, an W). Here, the inverter 117 is a rectangular wave inverter, and performs PWM (Pulse Width Modulation) control or alternatively one pulse (1 PLS) control depending on a switching flag inputted from the inverter control method determining section 127. Here, in the PWM control, a higher switching frequency permits the control of the output voltage of the inverter 117 with higher precision. On the other hand, in the 1 PLS control, the switching frequency is low and hence a switching loss is small.

The angular velocity calculating section 119 performs time differentiation of the electrical angle θm outputted from the resolver 101, so as to calculate the angular velocity ω of the rotator of the electric motor 10. The angular velocity ω calculated by the angular velocity calculating section 119 is inputted to the direct voltage command generating section 121.

The direct voltage command generating section 121 refers to a table describing a correspondence between the angular velocity ω and the output voltage command Vcu*, and thereby generates an output voltage command Vcu* for instructing the DC-DC converter 123 to output a fixed direct voltage corresponding to the angular velocity ω inputted from the angular velocity calculating section 119. The output voltage command Vcu* is inputted to the DC-DC converter 123. The DC-DC converter 123 raises or lowers the output direct voltage of the condenser 15 in the intact direct-current form. The output voltage detecting section 125 detects the output voltage Vdc of the DC-DC converter 123.

Based on the output voltage Vdc of the DC-DC converter 123 as well as the command value Vd for the d-axis voltage outputted from the d-axis current control section 111 and the command value Vq for the q-axis voltage outputted from the q-axis current control section 113, the inverter control method determining section 127 determines a switching flag to be inputted to the inverter 117.

FIG. 19 is a block diagram showing an internal configuration of the inverter control method determining section 127 and a relation with components relevant to this. As shown in FIG. 19, the inverter control method determining section 127 has a maximum voltage circle calculating section 201, an output voltage circle calculating section 203, and a switching flag output section 205. The maximum voltage circle calculating section 201 derives a value Vp_target (Vdc/√6) obtained by dividing by √6 the output voltage Vdc of the DC-DC converter 123. This value Vp_target is the maximum of the phase voltage allowed to be applied onto the electric motor 10, that is, a phase voltage value applied onto the electric motor 10 in a state that the duty ratio in the inverter 117 is 100%.

The output voltage circle calculating section 203 derives the calculation result of $\sqrt{(Vd^{2}+Vq^{2})}$ as a resultant vector voltage Vp. The switching flag output section 205 outputs a switching flag corresponding to the difference ΔVp (=Vp_target−Vp) between the value Vp_target derived by the maximum voltage circle calculating section 201 and the resultant vector voltage Vp derived by the output voltage circle calculating section 203. When the difference ΔVp is greater than 0 (ΔVp>0), the switching flag output section 205 outputs a switching flag specifying PWM control, and when the difference ΔVp is smaller than or equal to 0 (ΔVp≤0), outputs a flag specifying 1 PLS control.

PRIOR ART REFERENCE

Patent Document

Patent Document 1: Japanese Laid-Open Patent Publication No. 2005-51894

SUMMARY OF THE INVENTION

Problem to be Solved by the Invention

In the control apparatus for the electric motor 10 described above, the DC-DC converter 123 is controlled such as to output a fixed direct voltage corresponding to the angular velocity ω of the rotator of the electric motor 10. Further, the inverter 117 performs PWM control when the difference ΔVp (=Vp_target−Vp) derived by the inverter control method determining section 127 is greater than zero (ΔVp>0), and performs 1 PLS control when the difference ΔVp is smaller than or equal to zero (ΔVp≤0). As such, in order that the output range of the electric motor 10 should be extended, the DC-DC converter 123 is controlled such as to output a high voltage when the electric motor 10 is at high rotation rates. Then, the torque of the electric motor 10 is controlled by the PWM control or the 1 PLS control performed by the inverter 117.

In the electric motor 10 to which phase voltages are applied from the inverter 117, only six commutation timings occur in one electrical angle period. Thus, the inverter 117 during 1 PLS control is allowed to change the output only six times in one electrical angle period. Further, in a state that generating of an overshoot in each phase current supplied to the electric motor 10 is suppressed, the inverter 117 need establish balance between the applied voltage onto the electric motor 10, the induction voltage generated in the electric motor 10, and the impedance of the electric motor 10. Thus, slow response is caused in the torque outputted from the electric motor 10 when the inverter 117 performs 1 PLS control. Thus, a loss is generated by this response delay.

An object of the present invention is to provide a control apparatus for an electric motor in which a loss caused by a response delay of the electric motor can be reduced.

Means for Solving the Problem

In order to resolve the above-mentioned problem so as to achieve the above-mentioned object, the control apparatus for the electric motor according to the invention described in claim 1 is a control apparatus for an electric motor (e.g., an electric motor 10 in embodiments) provided with a rotator (e.g., a rotator 11 in the embodiments) having a permanent magnet and with a stator (e.g., a stator 13 in the embodiments) for generating a rotating magnetic field by an applied voltage and revolving the rotator, the control apparatus including: a rectangular wave inverter (e.g., an inverter 117 in the embodiments) that applies a rectangular wave voltage onto the stator of the electric motor to drive the electric motor; a voltage converting section (e.g., a DC-DC converter 123 in the embodiments) that raises or lowers an output voltage of a direct-current power supply (e.g., a condenser 15 in the embodiments) and applies the voltage onto the rectangular wave inverter; an electrical angle acquiring section (e.g., a resolver 101 and a phase estimation section 173 in the embodiments) that acquires an electrical angle of the rotator of the electric motor; and an output voltage command generating section (e.g., an output voltage command generating section 151, 171, or 181 in the embodiments) that generates a command for instructing the voltage converting section to output an electrical-angle synchronized voltage whose amplitude ripples in synchronization with a change of the electrical angle of the rotator acquired by the electrical angle acquiring section. The control apparatus is characterized in that, in response to the command generated by the output voltage command generating section, the voltage converting section raises or lowers the output voltage of the direct-current power supply to a voltage indicated by the command and applies the voltage onto the rectangular wave inverter.

Further, the control apparatus for the electric motor according to the invention described in claim 2 is characterized in that, the rectangular wave inverter applies multi-phase rectangular wave voltages onto the stator, and a ripple pattern indicated by the command generated by the output voltage command generating section is such a waveform that the amplitude of the electrical-angle synchronized voltage varies with a period defined as a predetermined amount of change of the electrical angle and that the electrical-angle synchronized voltage has the maximum at electrical angles where any one of the absolute values of the multi-phase rectangular wave voltages has the maximum.

Further, the control apparatus for the electric motor according to the invention described in claim 3 is characterized in that an average of the electrical-angle synchronized voltage is a value acquired in correspondence to a difference between a required output power derived based on a torque required for the electric motor and an angular velocity of the rotator and an actual output power derived based on the output voltage and the output current of the voltage converting section.

Further, the control apparatus for the electric motor according to the invention described in claim 4 is a control apparatus for the electric motor (e.g., an electric motor 10 in the embodiments) provided with a rotator (e.g., a rotator 11 in the embodiments) having a permanent magnet and with a stator (e.g., a stator 13 in the embodiments) for generating a rotating magnetic field by an applied voltage and revolving the rotator, the control apparatus including: a rectangular wave inverter (e.g., an inverter 117 in the embodiments) that applies a rectangular wave voltage onto the stator of the electric motor to drive the electric motor; a voltage converting section (e.g., a DC-DC converter 123 in the embodiments) that raises or lowers an output voltage of a direct-current power supply (e.g., a condenser 15 in the embodiments) and applies the voltage onto the rectangular wave inverter; and an output voltage command generating section (e.g., an output voltage command generating section 161 in the embodiments) that generates a command for instructing the voltage converting section to output an electrical-angle synchronized voltage whose amplitude ripples in synchronization with a change of the rectangular wave voltage applied onto the stator. The control apparatus is characterized in that, in response to the command generated by the output voltage command generating section, the voltage converting section raises or lowers the output voltage of the direct-current power supply to a voltage indicated by the command and applies the voltage onto the rectangular wave inverter.

Further, the control apparatus for the electric motor according to the invention described in claim 5 is characterized in that the rectangular wave inverter applies multi-phase rectangular wave voltages onto the stator, and a ripple pattern indicated by the command generated by the output voltage command generating section is such a waveform that the maximum of the electrical-angle synchronized voltage corresponds to electrical angles where any two phase voltages among the multi-phase rectangular wave voltages have the same value.

Further, the control apparatus for the electric motor according to the invention described in claim 6 is characterized in that the rectangular wave inverter applies multi-phase rectangular wave voltages onto the stator, and a ripple pattern indicated by the command generated by the output voltage command generating section is such a waveform that the maximum of the electrical-angle synchronized voltage corresponds to electrical angles where any one phase voltage among the multi-phase rectangular wave voltages becomes 0.

Further, the control apparatus for the electric motor according to the invention described in claim 7 includes an angular velocity acquiring section (e.g., an angular velocity calculating section 119 in the embodiments) that acquires an angular velocity of the rotator of the electric motor. The control apparatus is characterized in that an average of the electrical-angle synchronized voltage is a value acquired in correspondence to a difference between a required output power derived based on a torque required for the electric motor and an angular velocity of the rotator and an actual output power derived based on the output voltage and the output current of the voltage converting section.

Further, in the control apparatus for the electric motor according to the invention described in claim 8 is characterized in that the voltage converting section (e.g., a DC-DC converter 223 in the embodiments) is a step-up type voltage converting section for raising the output voltage of the direct-current power supply and applying the voltage onto the rectangular wave inverter, the output voltage command generating section outputs the command for instructing the voltage converting section to output the electrical-angle synchronized voltage when the minimum value of the electrical-angle synchronized voltage is greater than the output voltage of the direct-current power supply, and outputs a command for instructing the voltage converting section to output a fixed voltage when the minimum value of the electrical-angle synchronized voltage is smaller than or equal to the output voltage of the direct-current power supply, and in response to the command outputted by the output voltage command generating section, the voltage converting section raises the output voltage of the direct-current power supply to a voltage indicated by the command and applies the voltage onto the rectangular wave inverter.

Effect of the Invention

According to the control apparatus for the electric motor according to the invention described in claims 1 to 8, even when the rectangular wave inverter performs 1 PLS control, a loss caused by a response delay of the electric motor can be reduced. That is, the voltage converting section outputs an electrical-angle synchronized voltage whose amplitude ripples in synchronization with a change of the electrical angle of the rotator of the electric motor. This reduces the torque ripple of the electric motor caused by the change of the electrical angle, and hence reduces the loss caused by the slow response of the torque. Further, since the torque ripple is reduced, noise and vibration of the electric motor 10 are reduced.

According to the control apparatus for the electric motor according to the invention described in claims 4 to 7, an electrical angle acquiring section that acquires the electrical angle of the rotator of the electric motor is not provided. Thus, the output voltage command generating section can generate an electrical-angle synchronized voltage command not affected by an error in the electrical angle acquiring section.

MODE FOR CARRYING OUT THE INVENTION

Embodiments of the present invention are described below with reference to the drawings.

(First Embodiment)

Figure 1:
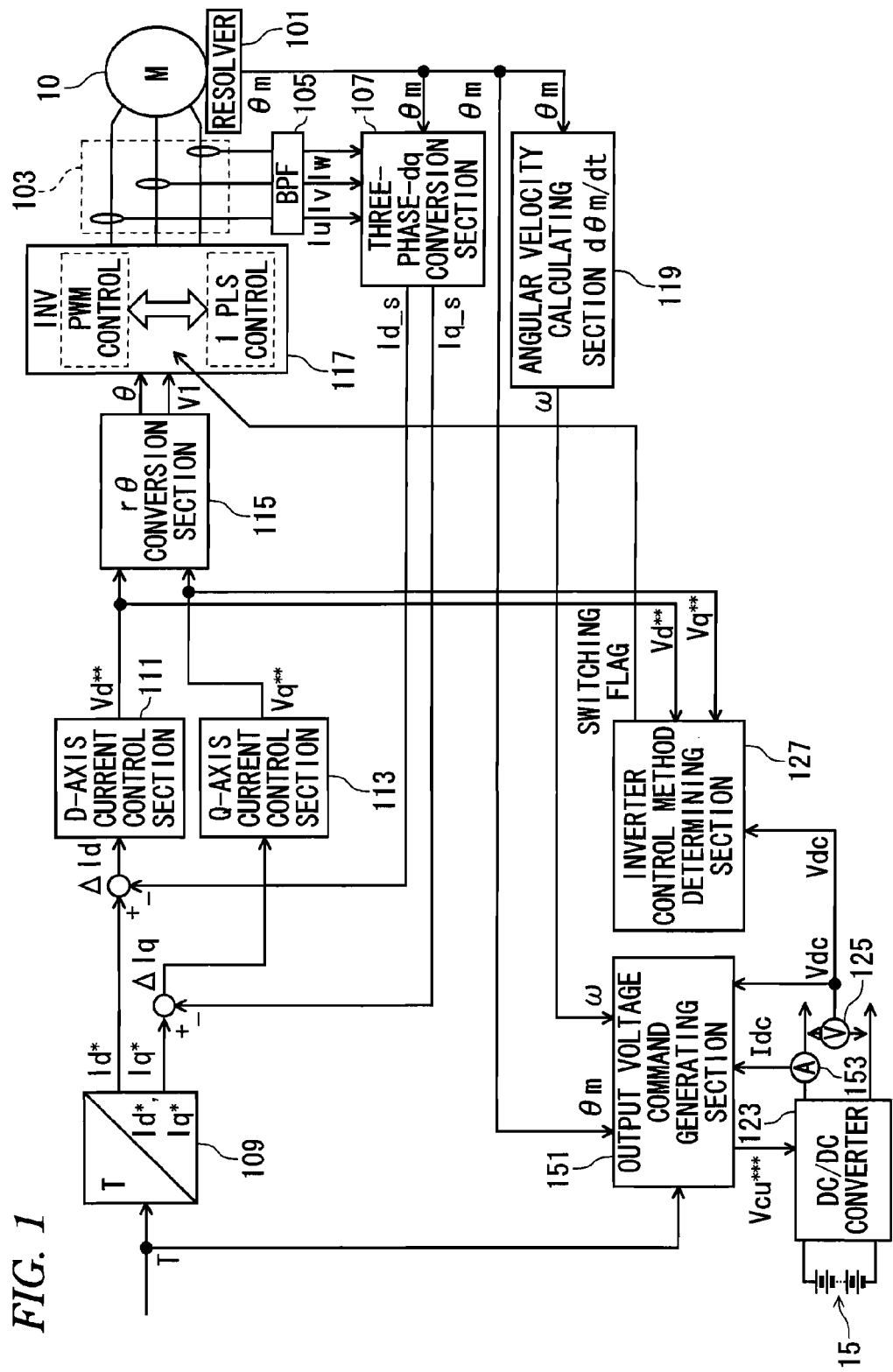
FIG. 1 is a block diagram showing a control apparatus for an electric motor according to a first embodiment.
Figure 18:
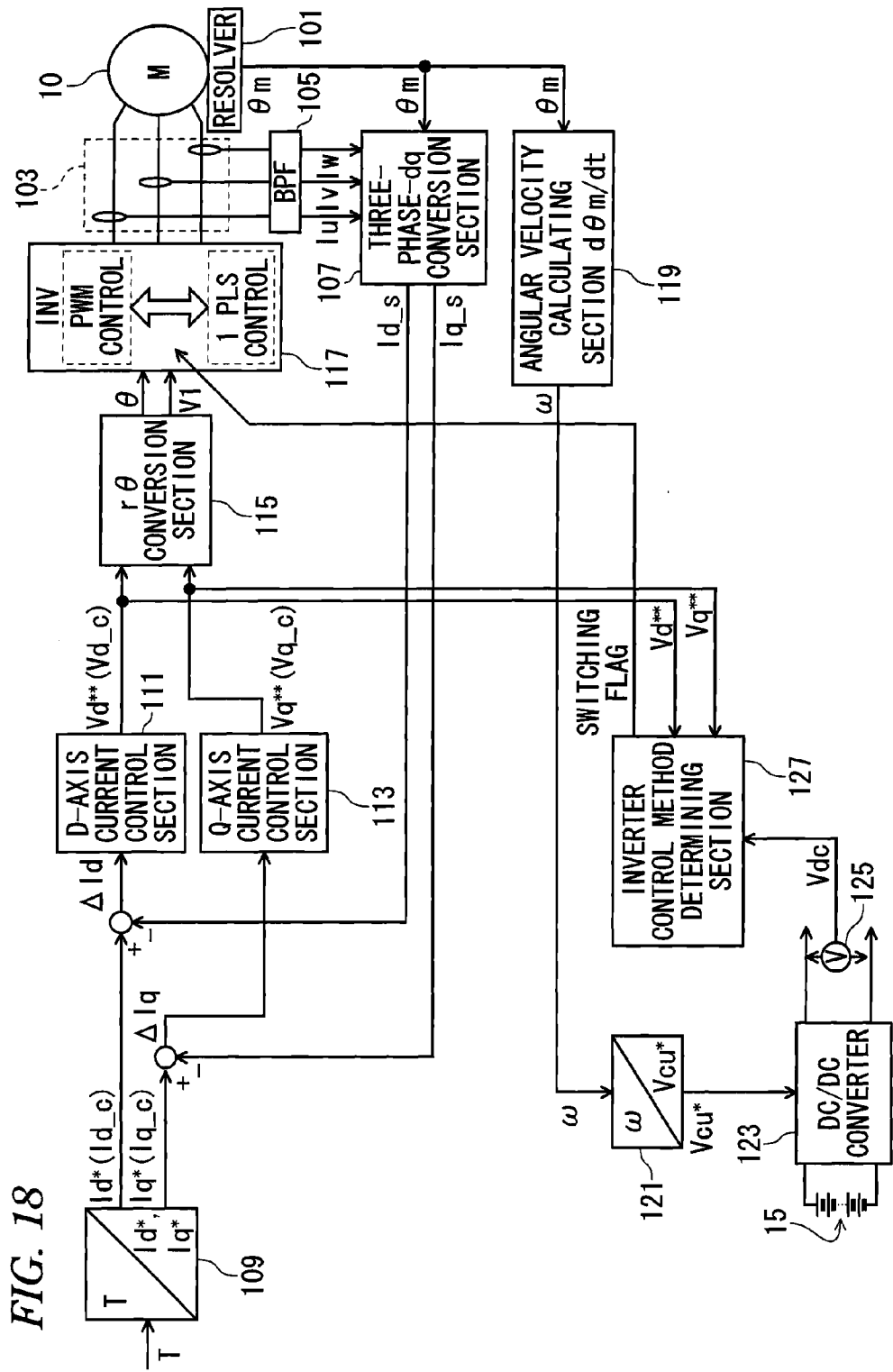
FIG. 18 is a block diagram showing a control apparatus for an electric motor according to related art to the present invention.

FIG. 1 is a block diagram showing a control apparatus for an electric motor according to a first embodiment. As shown in FIG. 1, similarly to the control apparatus for the electric motor shown in FIG. 18, the control apparatus for the electric motor according to the first embodiment has a resolver 101, a current sensor 103, a band pass filter (BPF) 105, a three-phase-dq conversion section 107, a current command calculating section 109, a d-axis current control section 111, a q-axis current control section 113, an rθconversion section 115, an inverter (INV) 117, an angular velocity calculating section 119, a DC-DC converter 123, an output voltage detecting section 125, and an inverter control method determining section 127, as well as an output voltage command generating section 151 serving as a replacement of the direct voltage command generating section 121. The control apparatus for the electric motor further has an output current detecting section 153. Here, in FIG. 1, like components to those in FIG. 18 are designated by like reference numerals.

Figure 2:
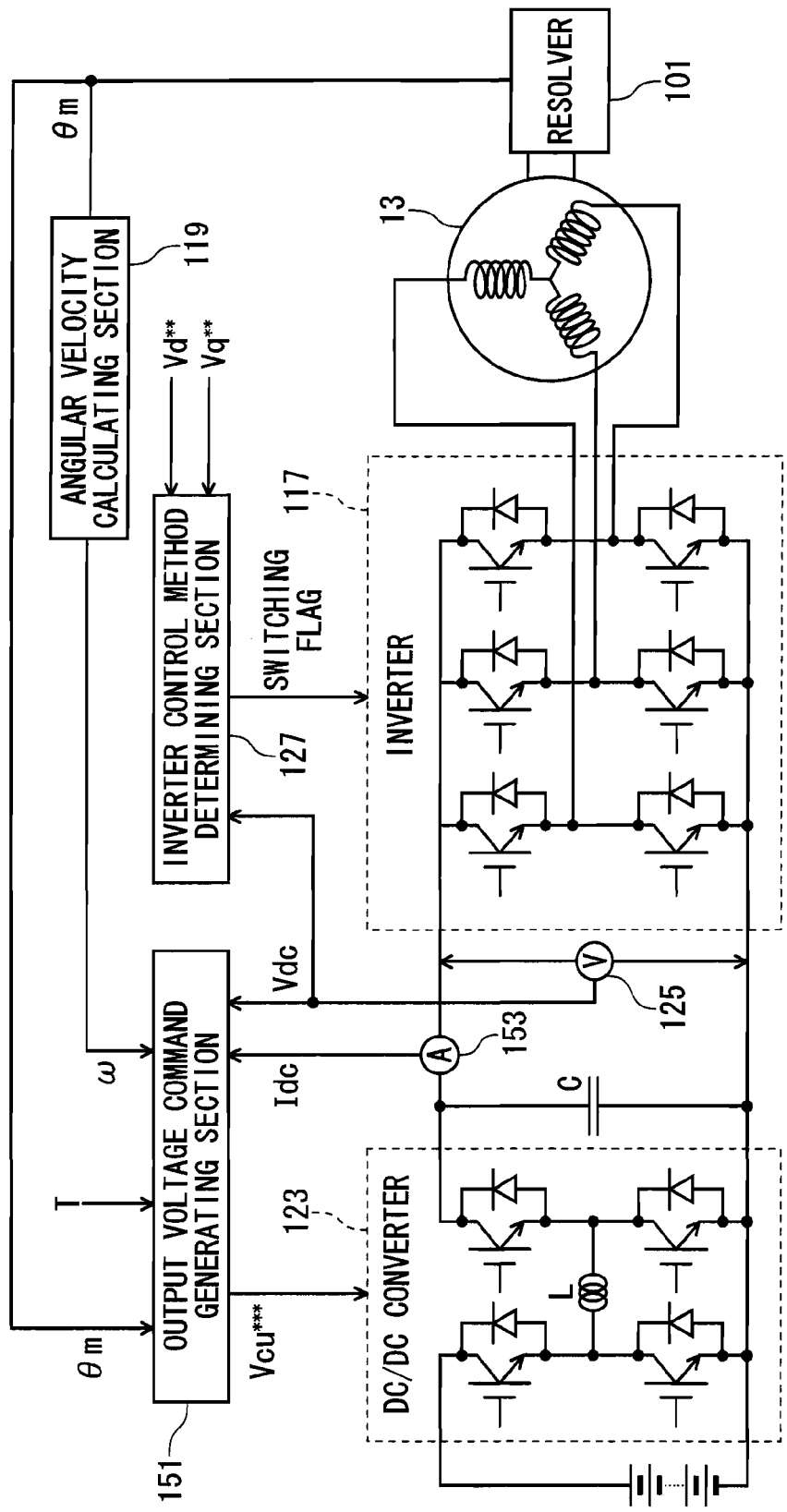
FIG. 2 is a block diagram showing a part of the control apparatus for the electric motor according to the first embodiment as well as circuits of a DC-DC converter and an inverter 117.

FIG. 2 is a block diagram showing a part of the control apparatus for the electric motor according to the first embodiment as well as the circuits of the DC-DC converter and the inverter 117. As shown in FIG. 2, the DC-DC converter 123 employed in the present embodiment is a step-up/down converter.

The output current detecting section 153 shown in FIGS. 1 and 2 detects the output current Idc of the DC-DC converter 123.

The output voltage command generating section 151 according to the present embodiment generates a command Vcu*** for instructing to the DC-DC converter 123 to output a voltage whose level varies in synchronization with the phase of the electrical angle θm of the rotator of the electric motor 10. As shown in FIGS. 1 and 2, the output voltage command generating section 151 receives: a torque command value T inputted from the outside; an angular velocity ω calculated by the angular velocity calculating section 119; an electrical angle θm outputted from the resolver 101; an output voltage Vdc of the DC-DC converter 123 detected by the output voltage detecting section 125; and an output current Idc of the DC-DC converter 123 detected by the output current detecting section 153.

Figure 3:
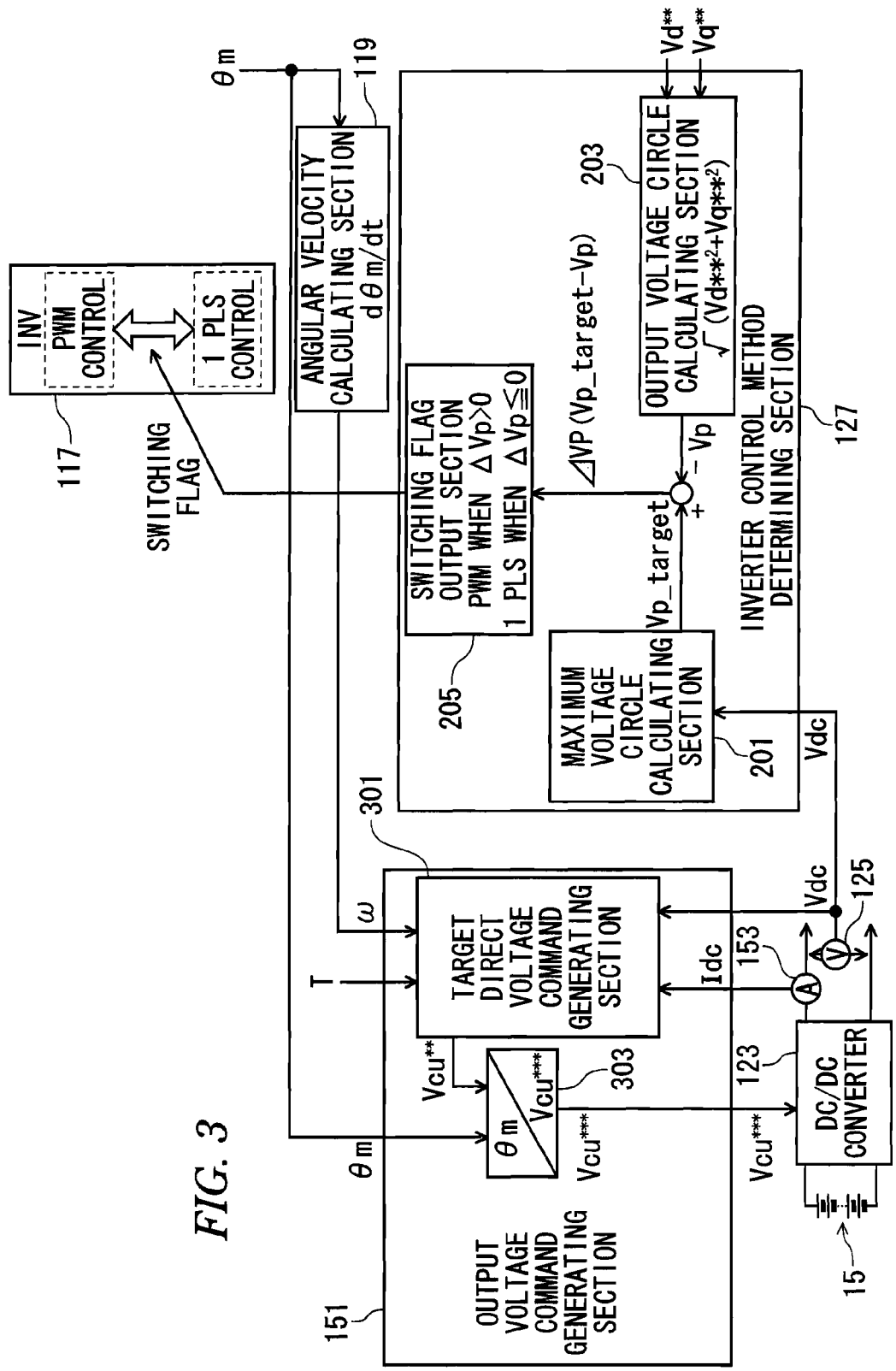
FIG. 3 is a block diagram showing, as a part of the control apparatus for the electric motor according to the first embodiment, internal configurations of an output voltage command generating section 151 and an inverter control method determining section 127, the control apparatus for the electric motor and a relation with components relevant to these.
Figure 4:
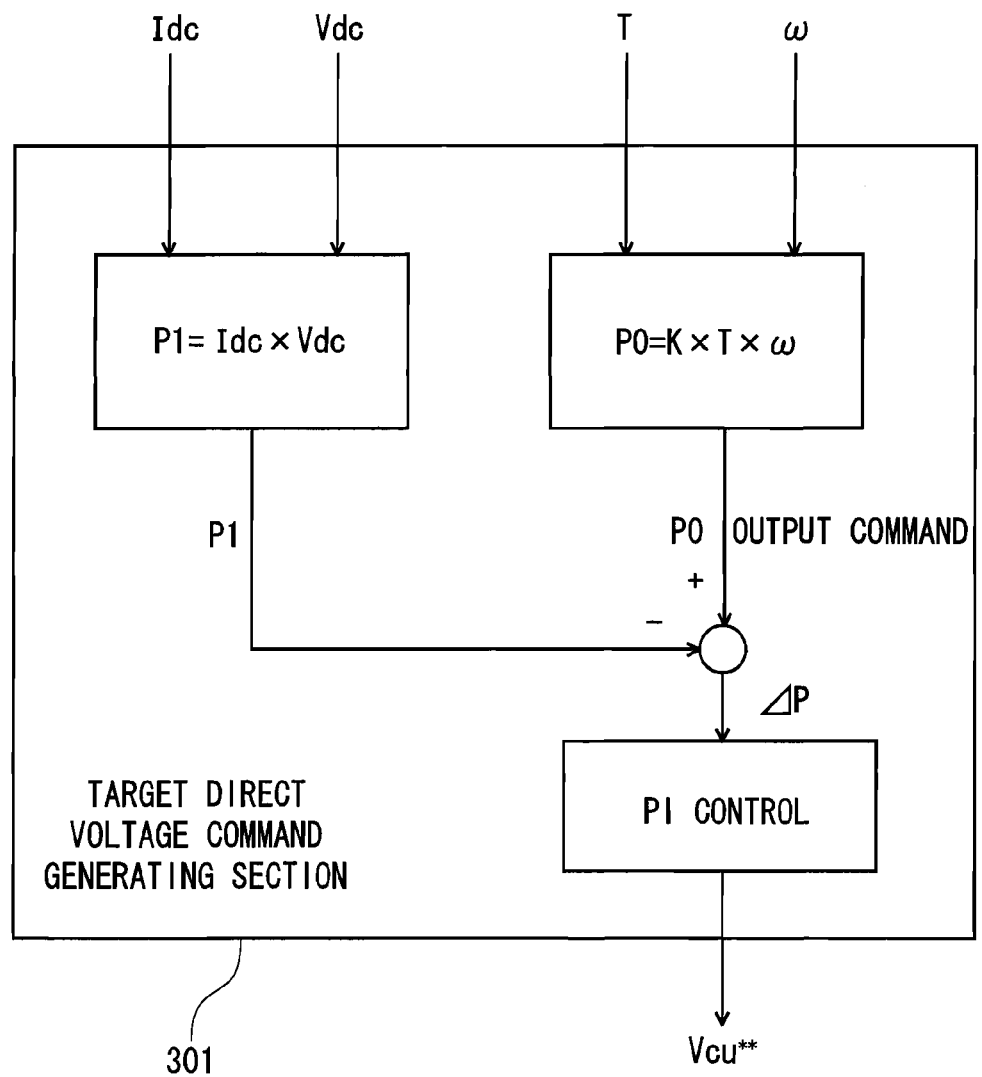
FIG. 4 is a block diagram showing an internal configuration of a target direct voltage command generating section 301 according to the first embodiment.
Figure 19:
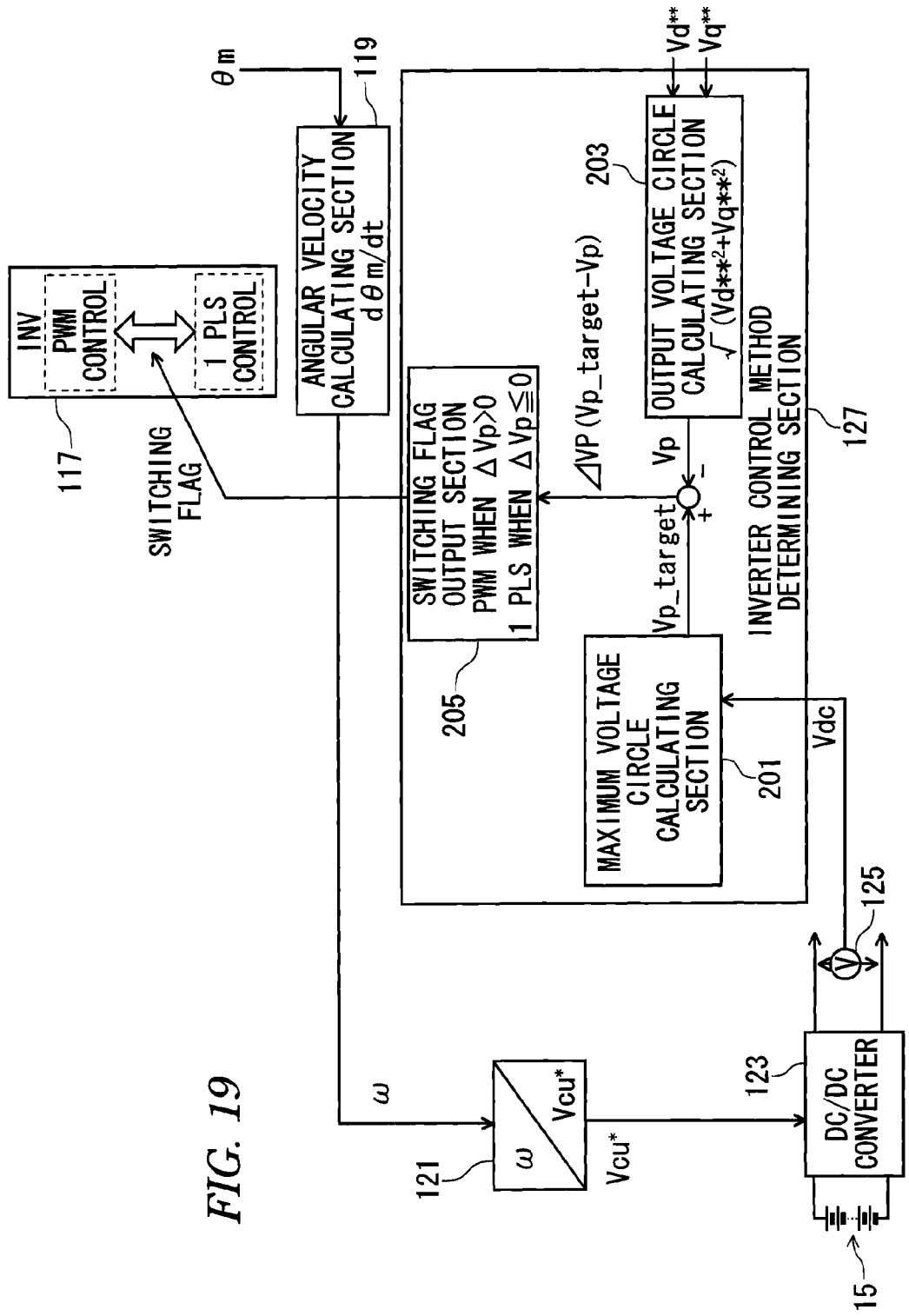
FIG. 19 is a block diagram showing an internal configuration of the inverter control method determining section 127 shown in FIG. 18 and a relation with components relevant to this.

FIG. 3 is a block diagram showing, as a part of the control apparatus for the electric motor according to the first embodiment, the internal configurations of the output voltage command generating section 151 and the inverter control method determining section 127 the control apparatus for the electric motor, and a relation with components relevant to these. Here, in FIG. 3, like components to those in FIG. 19 are designated by like reference numerals. As shown in FIG. 3, the output voltage command generating section 151 has a target direct voltage command generating section 301 and an electrical-angle synchronized voltage command generating section 303. FIG. 4 is a block diagram showing the internal configuration of the target direct voltage command generating section 301 according to the first embodiment.

As shown in FIG. 4, the target direct voltage command generating section 301 multiplies a coefficient K, the torque command value T, and the angular velocity ω with each other so as to derive a required output power P0. Further, the target direct voltage command generating section 301 multiplies the output current Idc and the output voltage Vdc of the DC-DC converter 123 with each other so as to derive an actual output power P1. The target direct voltage command generating section 301 generates a target direct voltage command Vcu as a controlled variable of PI control in accordance with the difference ΔP (=P0−P1) between the required output power P0 and the actual output power P1. The target direct voltage command Vcu is inputted to the electrical-angle synchronized voltage command generating section 303.

The electrical-angle synchronized voltage command generating section 303 generates an electrical-angle synchronized voltage command Vcu* for instructing the DC-DC converter 123 to output an electrical-angle synchronized voltage whose amplitude ripples in synchronization with change of the electrical angle θm of the rotator of the electric motor 10 and whose average value is equal to the target direct voltage command Vcu inputted from the electrical-angle synchronized voltage command generating section 303. The electrical-angle synchronized voltage command Vcu*** is inputted to the DC-DC converter 123.

Figure 5:
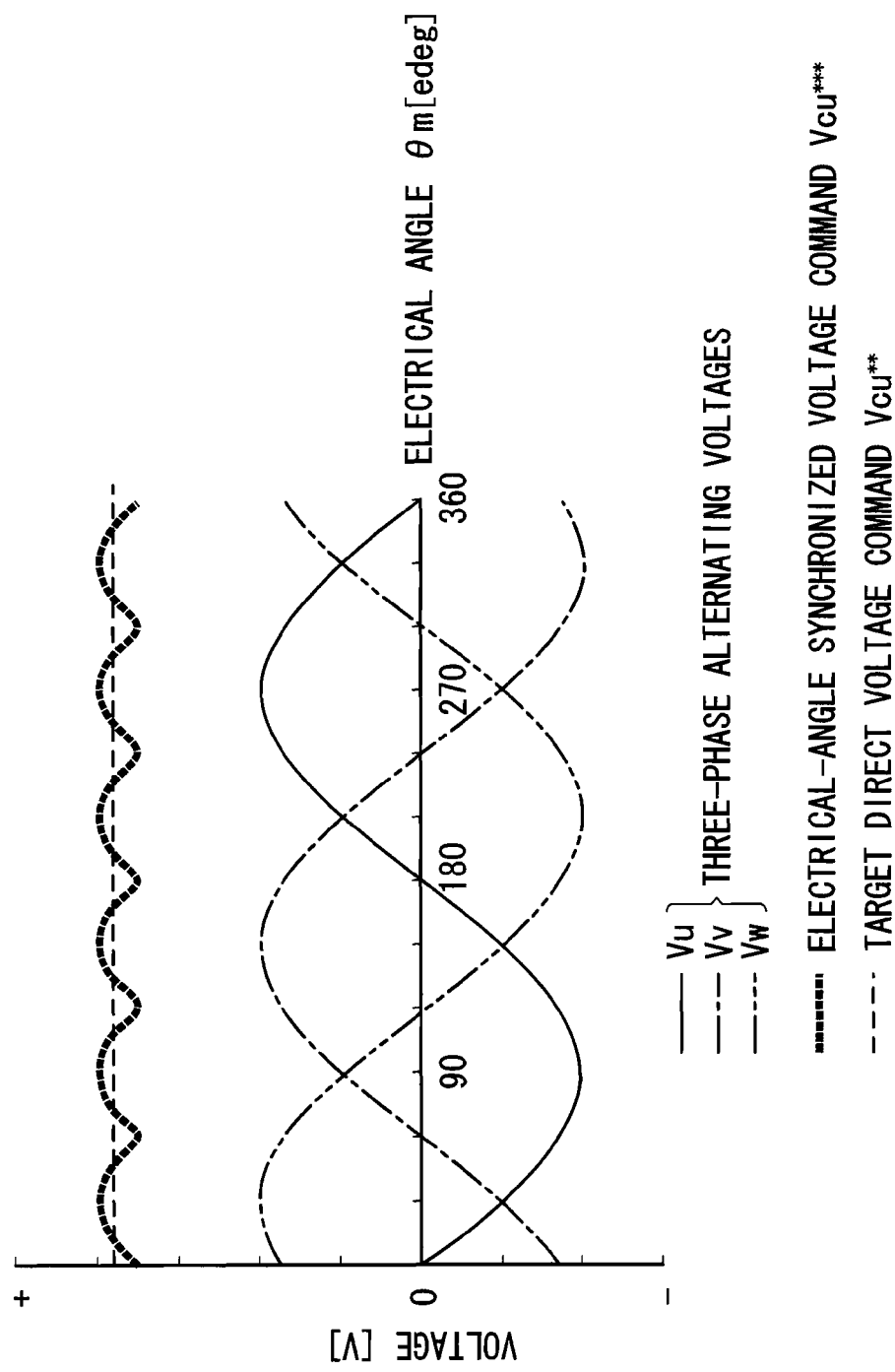
FIG. 5 is a graph showing: an output voltage of a DC-DC converter 123 in accordance with an electrical-angle synchronized voltage command Vcu*; a target direct voltage specified by a target direct voltage command Vcu; and three-phase alternating voltages applied onto an electric motor 10.

The ripple pattern synchronized with the electrical angle θm is stored in the form of a table or a formula in a memory (not shown). FIG. 5 is a graph showing: the output voltage of the DC-DC converter 123 in accordance with the electrical-angle synchronized voltage command Vcu*; the target direct voltage specified by the target direct voltage command Vcu; and three-phase alternating voltages applied onto the electric motor 10. The ripple pattern shown in FIG. 5 has a period of 60 degrees in the electrical angle and a waveform obtained by full-wave rectification of sine waves. Thus, the ripple pattern is expressed by a formula |k×sin(3θm)| (here, k is a coefficient).

In the control apparatus for the electric motor 10 according to the present embodiment described above, in response to the electrical-angle synchronized voltage command Vcu***, the DC-DC converter 123 outputs a voltage that ripple in synchronization with the electrical angle θm of the rotator of the electric motor 10. When the inverter 117 performs 1 PLS control, slow response is caused in the torque outputted from the electric motor 10. Thus, the inverter 117 cannot appropriately respond to the torque ripple caused by the change of the electrical angle θm of the rotator of the electric motor 10. However, in the present embodiment, the output voltage of the DC-DC converter 123 ripples in the ripple pattern shown in FIG. 5 in synchronization with the electrical angle θm. This reduces the torque ripple of the electric motor 10 caused by the change of the electrical angle θm, and hence reduces the loss caused by the slow response of the torque. Further, since the torque ripple of the electric motor 10 is reduced, noise and vibration of the electric motor 10 are reduced.

Figure 6:
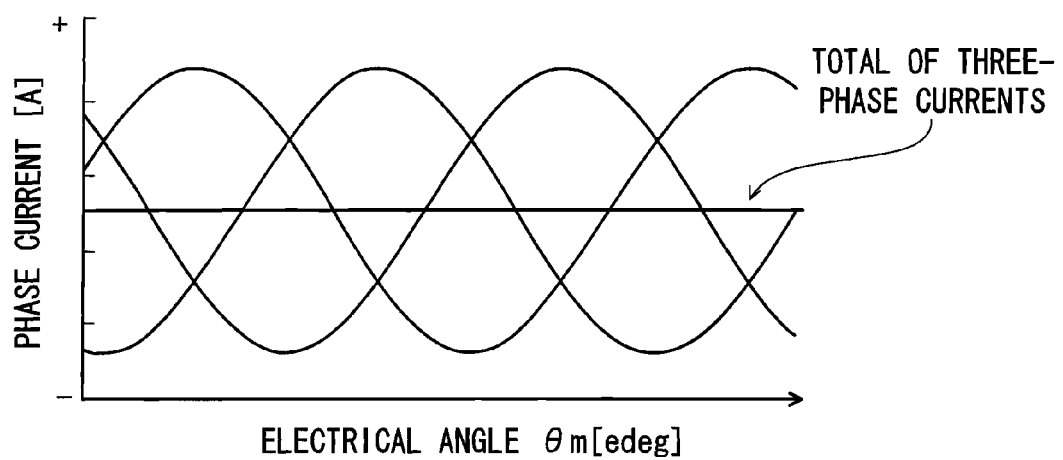
FIG. 6 is a graph showing: three-phase currents each configured of a fundamental wave alone; and their total value.
Figure 7:
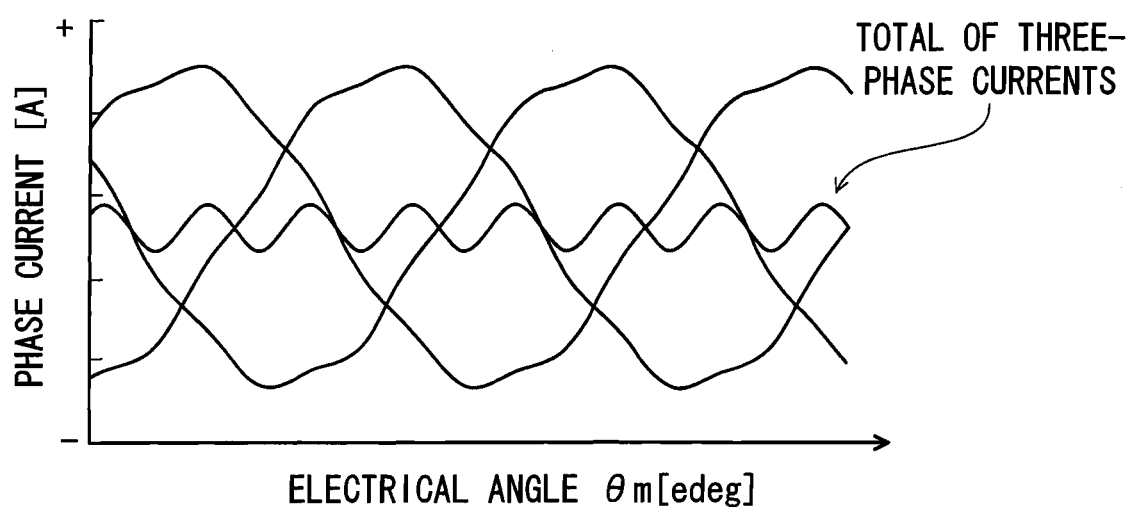
FIG. 7 is a graph showing: three-phase currents each obtained by superposing 20% of the sixth higher harmonic onto a fundamental wave; and their total value.

When each phase current outputted from the inverter 117 consists of a fundamental wave alone, the total value of the three-phase currents is 0 regardless of the electrical angle θm as shown in FIG. 6. Thus, even when the electrical angle θm varies, the torque of the electric motor 10 does not vary. Nevertheless, the phase current outputted from the inverter 117 which is a rectangular wave inverter contains higher harmonics. For example, the inverter 117 outputs three-phase currents each containing the sixth higher harmonic of 20% of the entire, in addition to the fundamental wave. Nevertheless, as shown in FIG. 7, the total value of the three-phase currents in which the sixth higher harmonic is superposed does not have a fixed value.

However, in the present embodiment, the voltage inputted from the DC-DC converter 123 to the inverter 117 ripples in synchronization with the electrical angle θm like in the present embodiment. Thus, when the change in the total value of the three-phase currents in which the sixth higher harmonic has been superposed is canceled out by the ripple of the output current of the DC-DC converter 123, the total value of the three-phase currents outputted from the inverter 117 has a fixed value. As a result, the higher harmonic in the phase current is suppressed. Thus, even when the inverter 117 performs 1 PLS control, its operating efficiency is improved.

Figure 8:
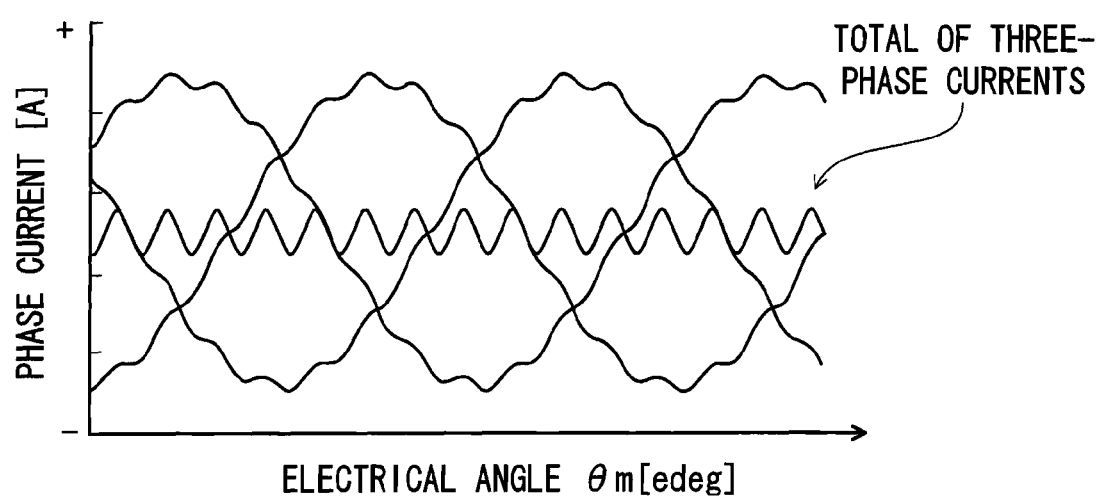
FIG. 8 is a graph showing: three-phase currents each obtained by superposing 20% of the twelfth higher harmonic onto a fundamental wave; and their total value.
Figure 9:
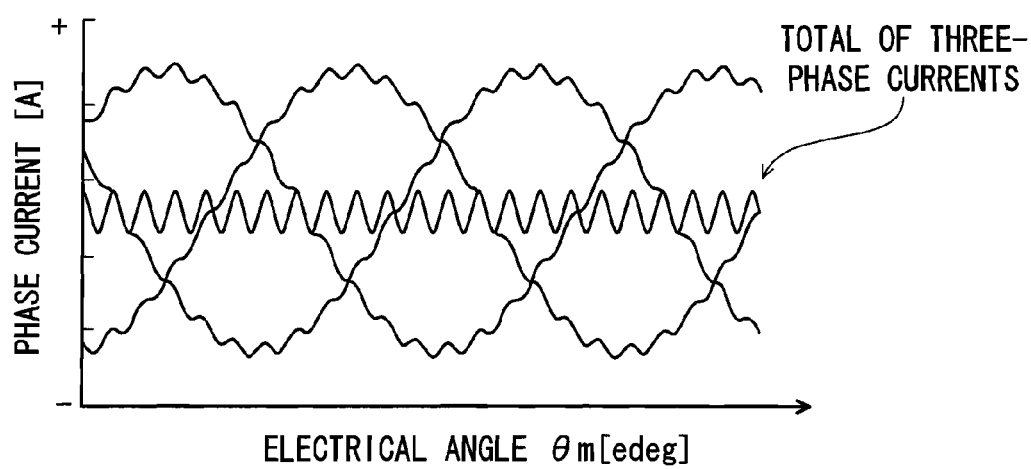
FIG. 9 is a graph showing: three-phase currents each obtained by superposing 20% of the 18th higher harmonic onto a fundamental wave; and their total value.

On the other hand, as shown in FIGS. 8 and 9, when the degree of the change in the total value of the three-phase currents in which the sixth higher harmonic has been superposed is increased by the ripple of the output current of the DC-DC converter 123 so that a higher harmonic is intentionally superposed in the phase current, the torque ripple of the electric motor 10 decreases. This reduces noise and vibration of the electric motor 10.

As such, when the voltage inputted from the DC-DC converter 123 to the inverter 117 ripples in synchronization with the electrical angle θm, the inverter 117 during 1 PLS control can output each phase voltage whose average amplitude varies in correspondence to the electrical angle θm without the necessity of changing into PWM control. Further, it is unnecessary that the control is changed from 1 PLS control to PWM control so that the switching frequency is increased. This reduces the switching loss in the inverter 117.

(Second Embodiment)

Figure 10:
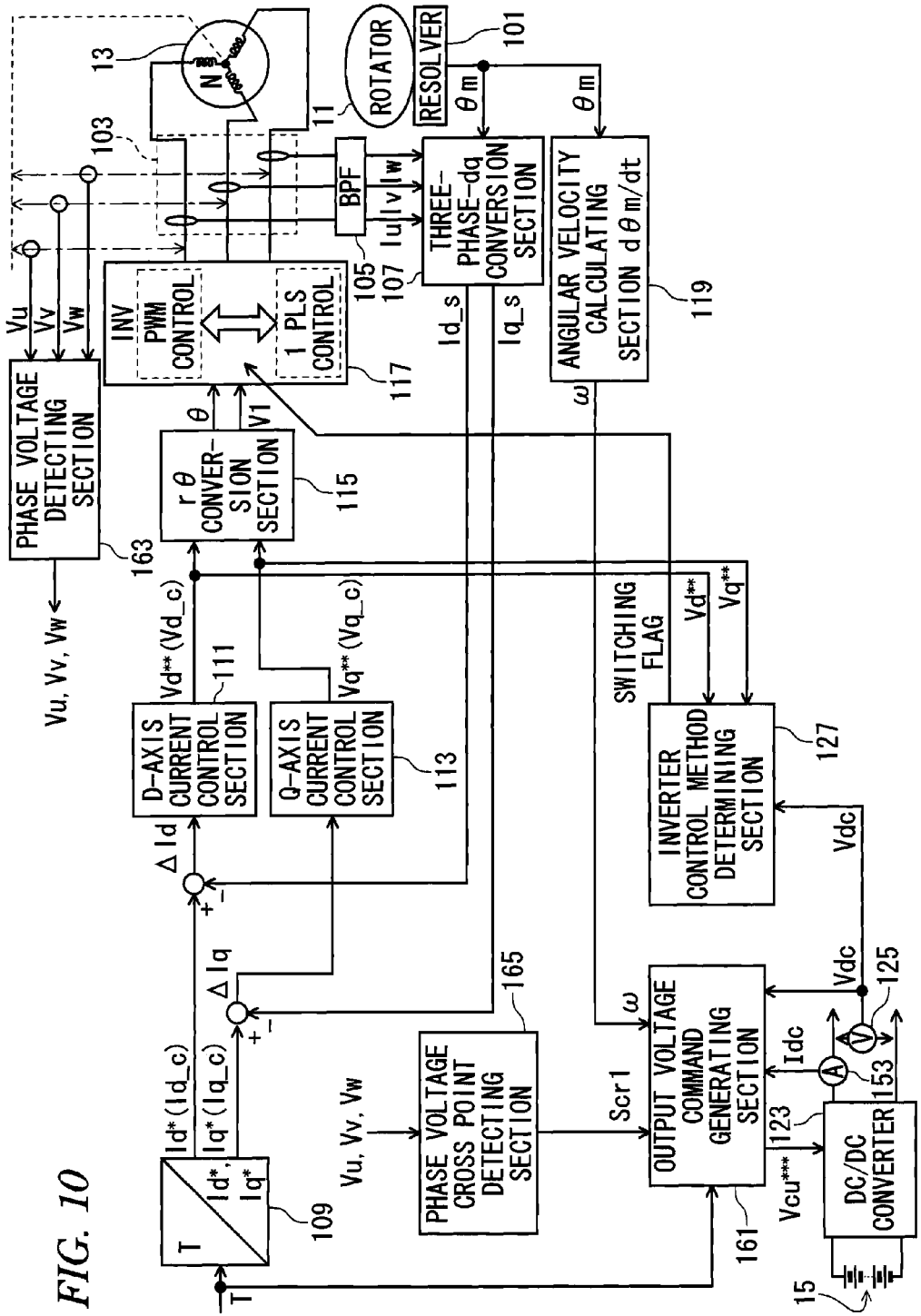
FIG. 10 is a block diagram showing a control apparatus for an electric motor according to a second embodiment.

FIG. 10 is a block diagram showing a control apparatus for an electric motor according to a second embodiment. As shown in FIG. 10, in addition to the components provided in the control apparatus for the electric motor according to the first embodiment shown in FIG. 1, the control apparatus for the electric motor according to the second embodiment has a phase voltage detecting section 163 and a phase voltage cross point detecting section 165. Here, in FIG. 10, like components to those in FIG. 1 are designated by like reference numerals.

The phase voltage detecting section 163 detects three-phase alternating voltages Vu, Vv, and Vw applied onto a stator 13 of the electric motor 10. The three-phase alternating voltages Vu, Vv, and Vw detected by the phase voltage detecting section 163 are inputted to the phase voltage cross point detecting section 165. The phase voltage cross point detecting section 165 detects a timing that any two phase voltages among the three-phase alternating voltages Vu, Vv, and Vw have the same value. When the phase voltage cross point detecting section 165 detects this timing, the phase voltage cross point detecting section 165 inputs the signal Scr1 into the output voltage command generating section 161. As such, the output voltage command generating section 161 according to the present embodiment receives the signal Scr1 from the phase voltage cross point detecting section 165, in place of the electrical angle θm of the rotator 11.

Figure 11:
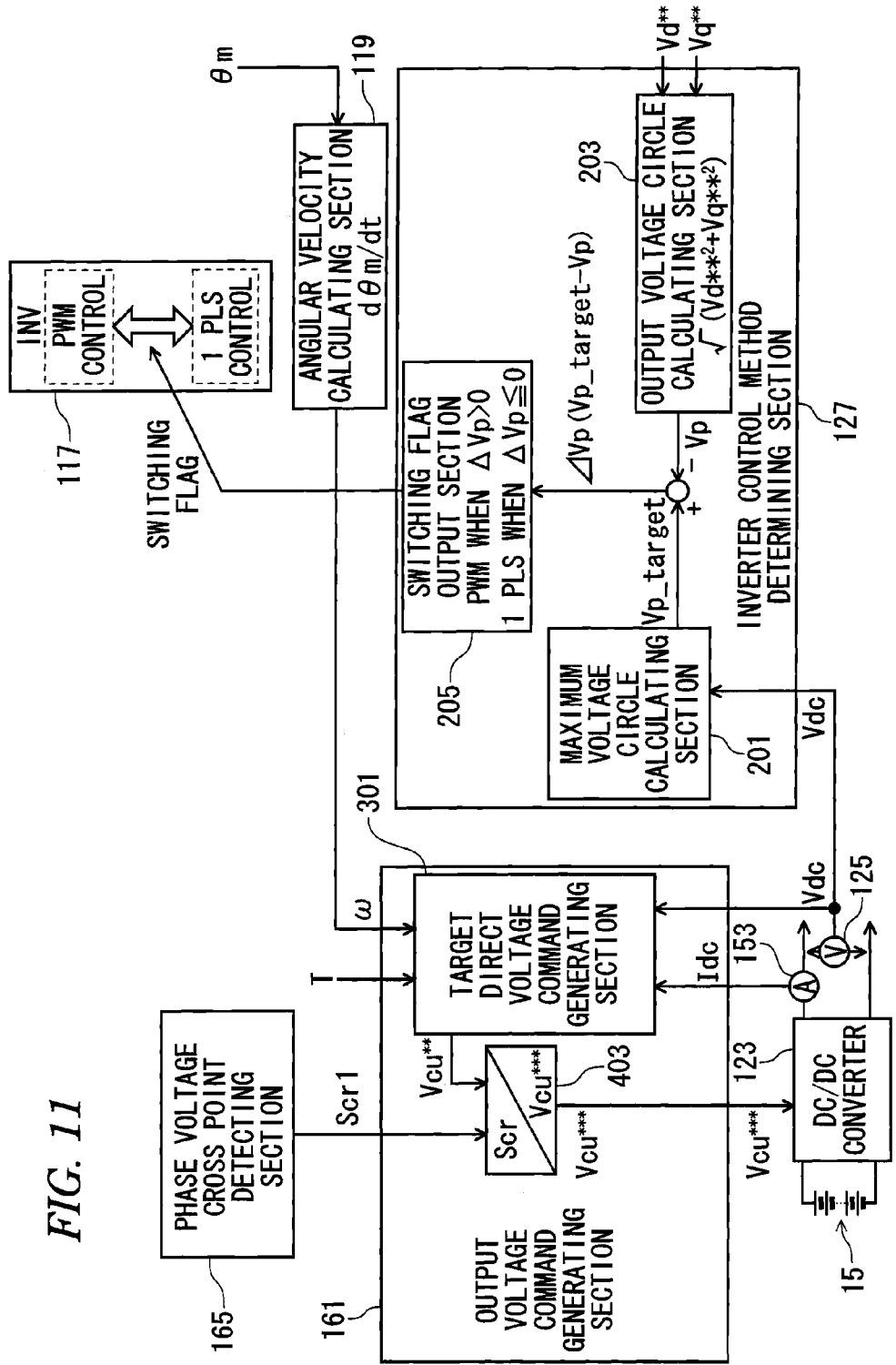
FIG. 11 is a block diagram showing, as a part of the control apparatus for the electric motor according to the second embodiment, internal configurations of an output voltage command generating section 161 and an inverter control method determining section 127 the control apparatus for the electric motor, and a relation with components relevant to these.

FIG. 11 is a block diagram showing, as a part of the control apparatus for the electric motor according to the second embodiment, the internal configurations of the output voltage command generating section 161 and the inverter control method determining section 127, the control apparatus for the electric motor and a relation with components relevant to these. Here, in FIG. 11, like components to those in FIG. 3 are designated by like reference numerals.

The electrical-angle synchronized voltage command generating section 403 provided in the output voltage command generating section 161 according to the present embodiment generates an electrical-angle synchronized voltage command Vcu* for instructing the DC-DC converter 123 to output an electrical-angle synchronized voltage whose amplitude ripples in synchronization with the signal Scr1 from the phase voltage cross point detecting section 165 and whose average value is equal to the target direct voltage command Vcu inputted from the electrical-angle synchronized voltage command generating section 403. In the ripple pattern synchronized with the signal Scr1, the timing that the signal Scr1 is inputted from the phase voltage cross point detecting section 165 corresponds to the maximum of the electrical-angle synchronized voltage.

Here, in another embodiment, in place of the phase voltage cross point detecting section 165, a phase voltage zero point detecting section may be provided that detects a timing that any one phase voltage among the three-phase alternating voltages Vu, Vv, and Vw becomes 0. When the phase voltage zero point detecting section detects this timing, the phase voltage zero point detecting section inputs the signal Scr2 into the output voltage command generating section 161.

The electrical-angle synchronized voltage command generating section 403 provided in the output voltage command generating section 161 generates an electrical-angle synchronized voltage command Vcu* for instructing the DC-DC converter 123 to output an electrical-angle synchronized voltage whose amplitude ripples in synchronization with the signal Scr2 from the phase voltage zero point detecting section and whose average value is equal to the target direct voltage command Vcu inputted from the electrical-angle synchronized voltage command generating section 403. In the ripple pattern synchronized with the signal Scr2, the timing that the signal Scr2 is inputted from the phase voltage zero point detecting section corresponds to the minimum of the electrical-angle synchronized voltage.

In the control apparatus for the electric motor 10 according to the present embodiment described above, an electrical-angle synchronized voltage command Vcu* is generated that corresponds to the signal Scr1 from the phase voltage cross point detecting section 165 or alternatively to the signal Scr2 from the phase voltage zero point detecting section in place of the electrical angle θm of a rotator 11 detected by the resolver 101. Thus, the electrical-angle synchronized voltage command generating section 403 according to the present embodiment can generate the electrical-angle synchronized voltage command Vcu* not affected by the detection error of the resolver 101.

(Third Embodiment)

Figure 12:
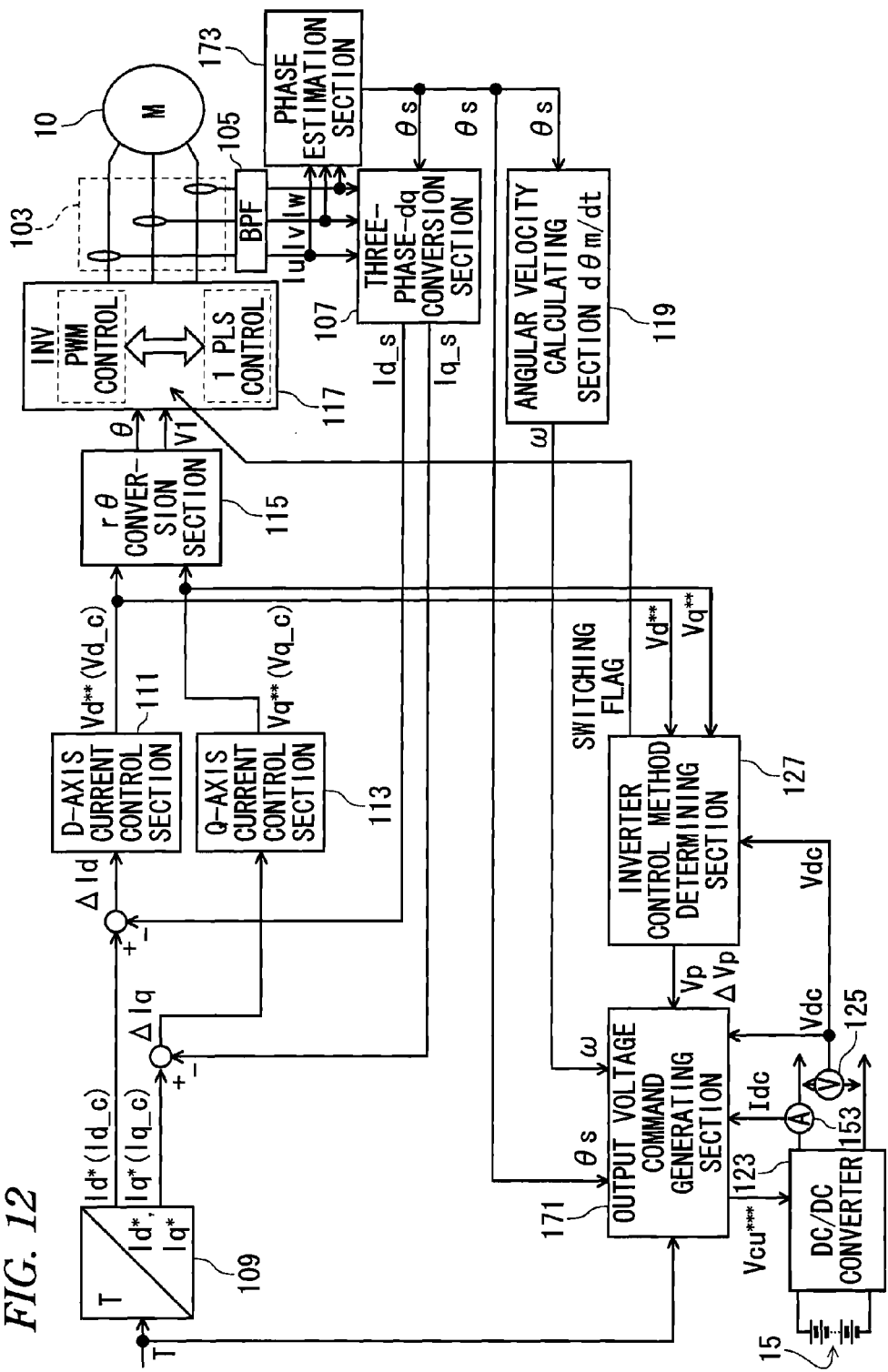
FIG. 12 is a block diagram showing a control apparatus for an electric motor according to a third embodiment.

FIG. 12 is a block diagram showing a control apparatus for an electric motor according to a third embodiment. As shown in FIG. 12, the control apparatus for the electric motor according to the third embodiment has a phase estimation section 173 in place of the resolver 101 provided in the control apparatus for the electric motor according to the first embodiment shown in FIG. 1. Here, in FIG. 12, like components to those in FIG. 1 are designated by like reference numerals.

The phase estimation section 173 estimates the electrical angle of the rotator of the electric motor 10 based on the three-phase alternating currents Iu, Iv, and Iw detected by the current sensor 103. The electrical angle θs estimated by the phase estimation section 173 is transmitted to the three-phase-dq conversion section 107, the angular velocity calculating section 119, and the output voltage command generating section 171. As such, the output voltage command generating section 171 according to the present embodiment receives the electrical angle θs estimated by the phase estimation section 173 in place of the electrical angle θm of the rotator 11 detected by the resolver 101. In the output voltage command generating section 171 according to the present embodiment, the electrical angle θs is treated as being similar to the electrical angle θm in the first embodiment.

(Fourth Embodiment)

Figure 13:
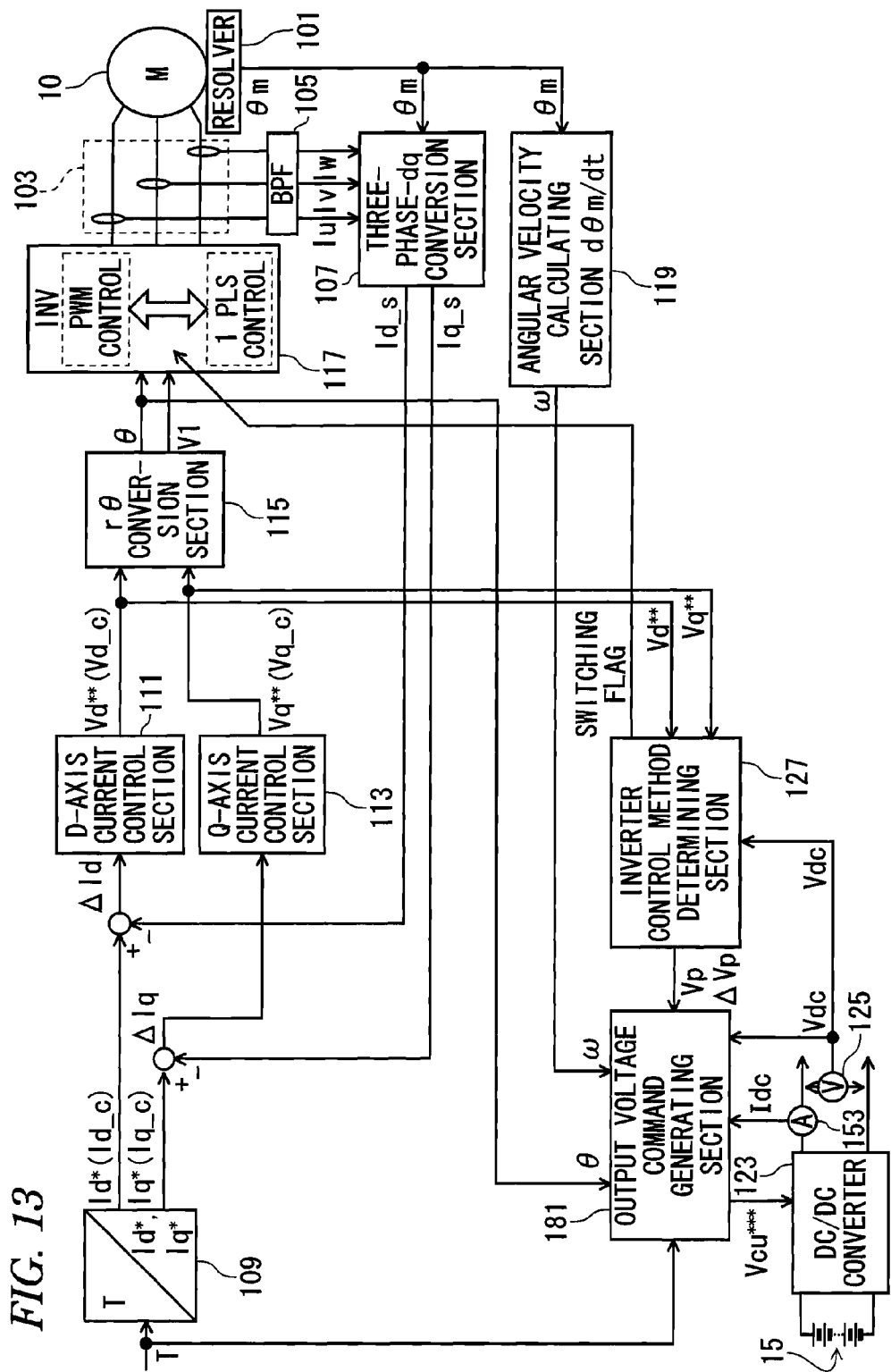
FIG. 13 is a block diagram showing a control apparatus for an electric motor according to a fourth embodiment.

FIG. 13 is a block diagram showing a control apparatus for an electric motor according to a fourth embodiment. As shown in FIG. 13, in the control apparatus for the electric motor according to the fourth embodiment, an angle θ outputted by the rθ conversion section 115 is inputted as the electrical angle of the rotator of the electric motor 10 to be inputted into the output voltage command generating section 181. Here, in FIG. 13, like components to those in FIG. 1 are designated by like reference numerals. In the output voltage command generating section 181 according to the present embodiment, the angle θ is treated as being similar to the electrical angle θm in the first embodiment.

(Fifth Embodiment)

Figure 14:
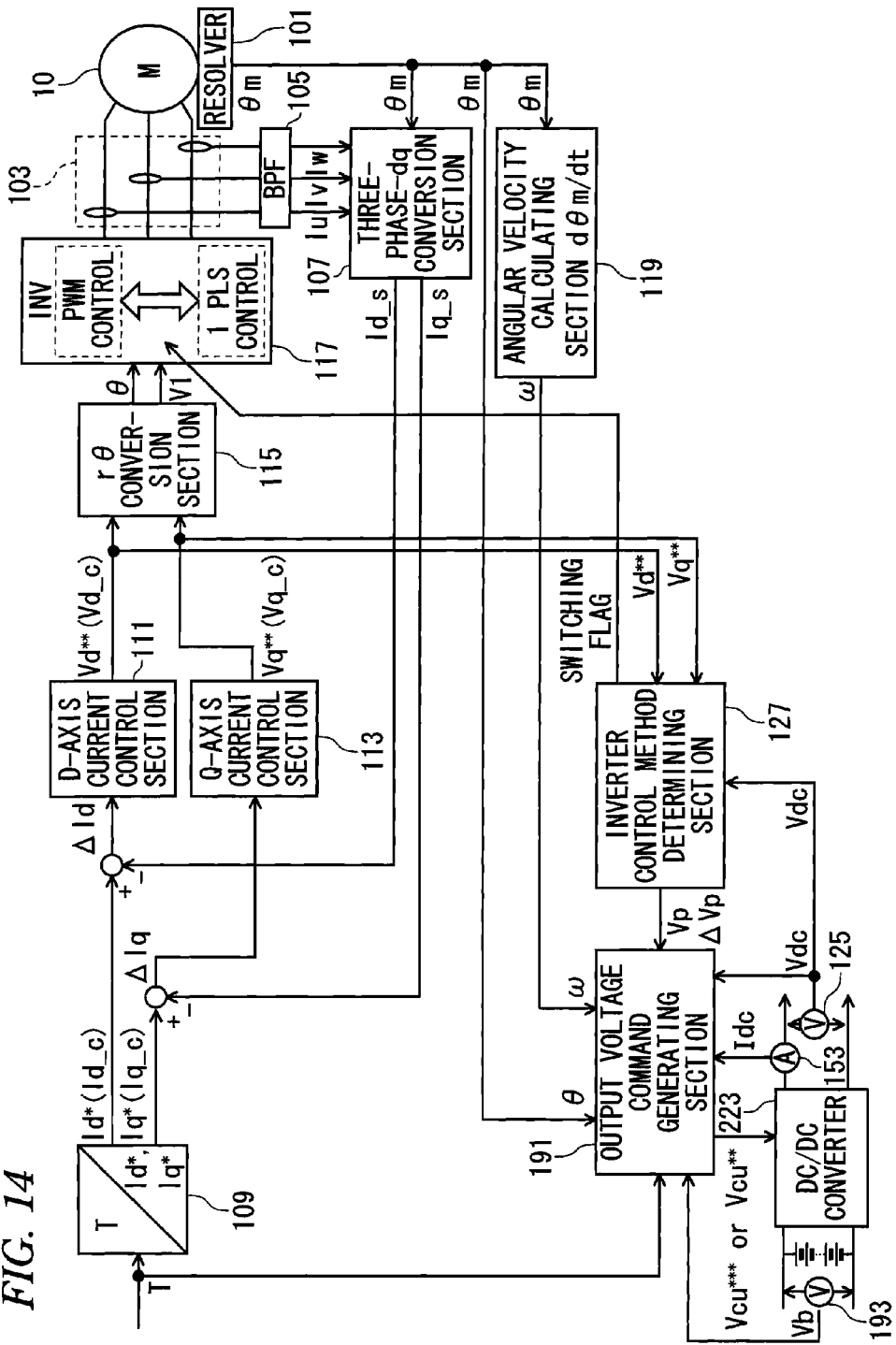
FIG. 14 is a block diagram showing a control apparatus for an electric motor according to a fifth embodiment.
Figure 15:
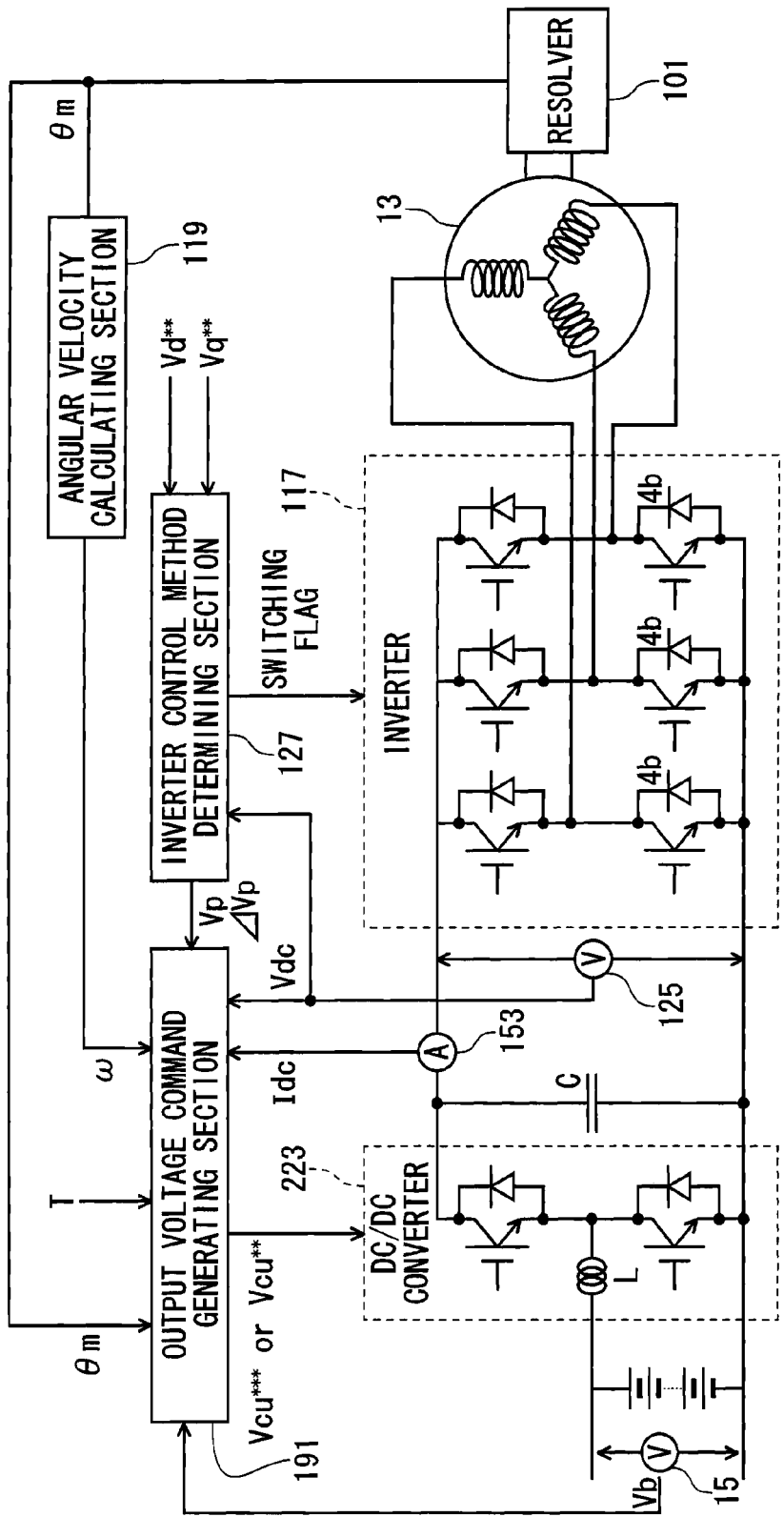
FIG. 15 is a block diagram showing a part of the control apparatus for the electric motor according to the fifth embodiment as well as circuits of a DC-DC converter and an inverter 117.

FIG. 14 is a block diagram showing a control apparatus for an electric motor according to a fifth embodiment. Further, FIG. 15 is a block diagram showing a part of the control apparatus for the electric motor according to the fifth embodiment as well as the circuits of the DC-DC converter and the inverter 117. As shown in FIG. 14, the control apparatus for the electric motor according to the fifth embodiment has a battery voltage detecting section 193 for detecting the output voltage (a "battery voltage", hereinafter) Vb of the condenser 15, in addition to the components provided in the control apparatus for the electric motor according to the first embodiment shown in FIG. 1. Here, the battery voltage Vb detected by the battery voltage detecting section 193 is inputted to the output voltage command generating section 191. Further, as shown in FIG. 15, the DC-DC converter 223 employed in the present embodiment is a step-up converter. That is, the DC-DC converter 223 performs step-up alone onto the output direct voltage of the condenser 15 in the intact direct-current form.

Further, as shown in FIG. 15, the internal configuration of the output voltage command generating section 191 according to the present embodiment is different from that of the output voltage command generating section 151 according to the first embodiment. Further, in the present embodiment, the inverter control method determining section 127 inputs to the output voltage command generating section 191: the resultant vector voltage Vp described in the first embodiment; and the difference ΔVp between the value Vp_target derived by the maximum voltage circle calculating section 201 and the resultant vector voltage Vp. Here, in FIGS. 14 and 15, like components to those in FIGS. 1 and 2 are designated by like reference numerals.

Figure 16:
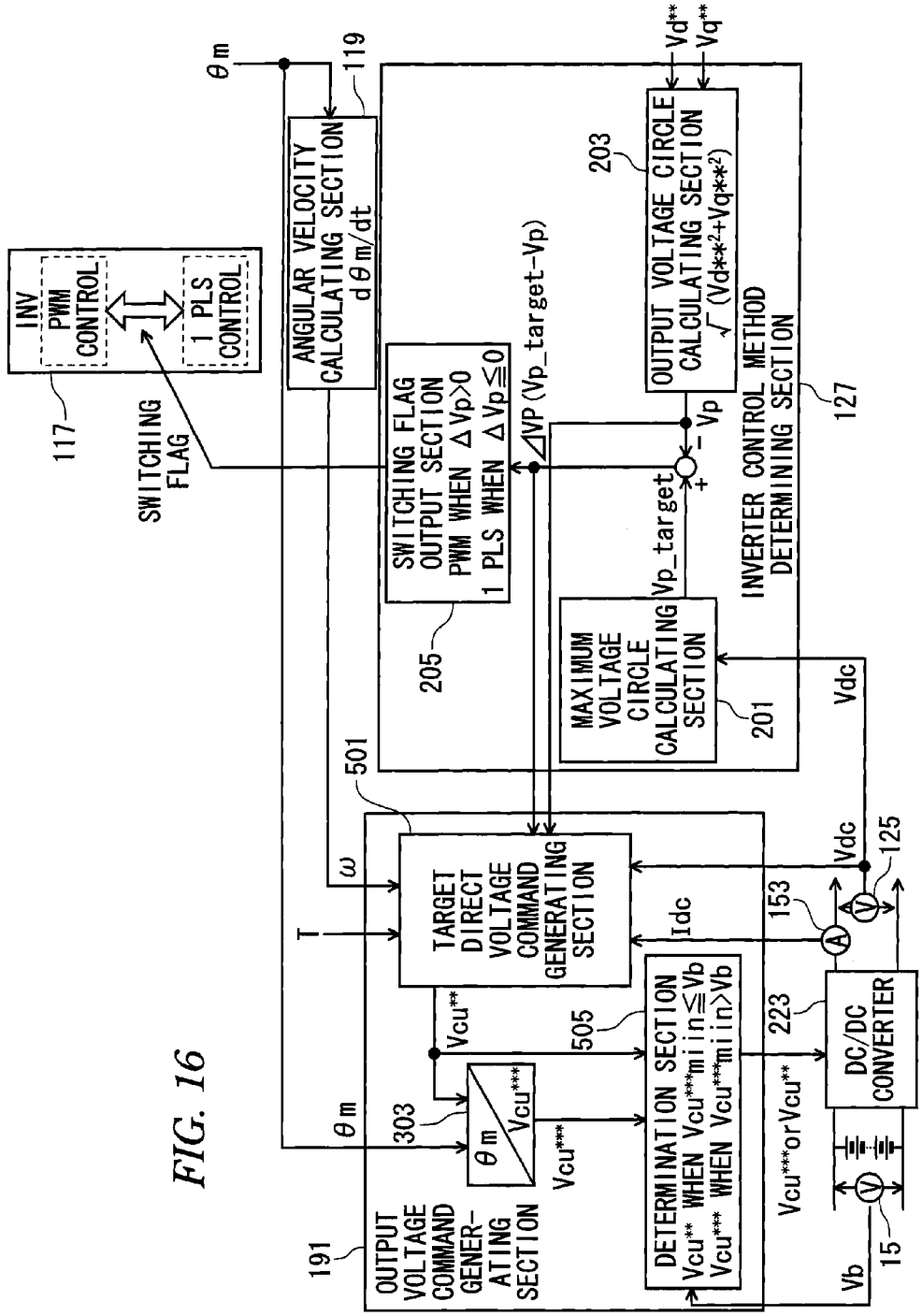
FIG. 16 is a block diagram showing, as a part of the control apparatus for the electric motor according to the fifth embodiment, internal configurations of an output voltage command generating section 191 and an inverter control method determining section 127 the control apparatus for the electric motor, and a relation with components relevant to these.
Figure 17:
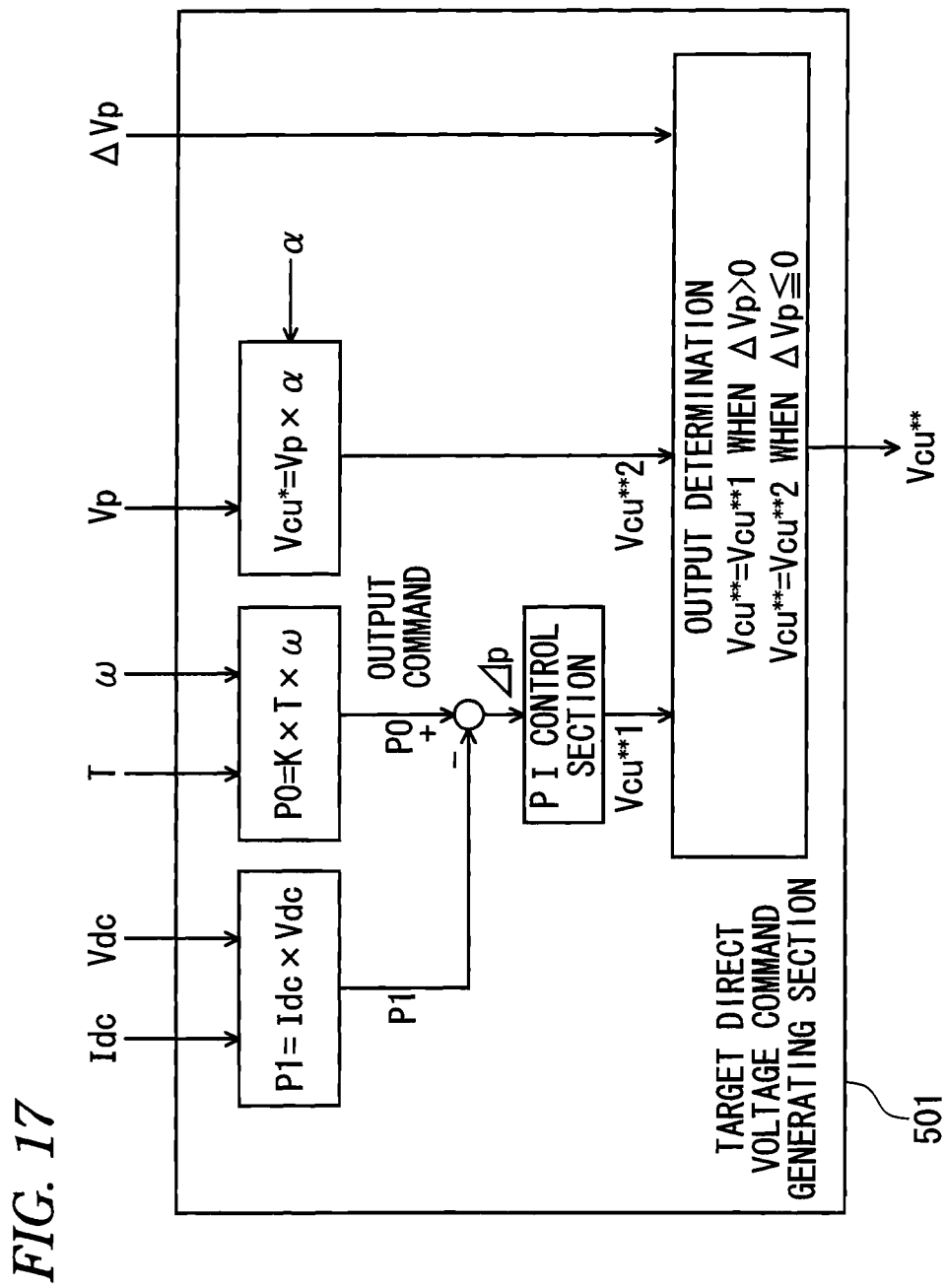
FIG. 17 is a block diagram showing an internal configuration of a target direct voltage command generating section 501 according to the fifth embodiment.

FIG. 16 is a block diagram showing, as a part of the control apparatus for the electric motor according to the fifth embodiment, the internal configurations of the output voltage command generating section 191 and the inverter control method determining section 127 the control apparatus for the electric motor, and a relation with components relevant to these. Here, in FIG. 16, like components to those in FIG. 3 are designated by like reference numerals. As shown in FIG. 16, the output voltage command generating section 191 according to the present embodiment has a target direct voltage command generating section 501, an electrical-angle synchronized voltage command generating section 303, and a determination section 505. FIG. 17 is a block diagram showing the internal configuration of the target direct voltage command generating section 501 according to the fifth embodiment.

As shown in FIG. 17, similarly to the first embodiment, the target direct voltage command generating section 501 generates a target direct voltage command Vcu1 as a controlled variable of PI control in accordance with the difference ΔP (=P0−P1) between the required output power P0 and the actual output power P1. Further, the target direct voltage command generating section 501 multiplies the resultant vector voltage Vp inputted from the inverter control method determining section 127 and the voltage utilization factor α ($\sqrt{6}$) with each other so as to generate a target direct voltage command Vcu2. Further, the target direct voltage command generating section 501 outputs a target direct voltage command Vcu corresponding to the difference ΔVp inputted from the inverter control method determining section 127. That is, the target direct voltage command generating section 501 outputs the target direct voltage command Vcu1 when ΔVp>0, and outputs the target direct voltage command Vcu**2 when ΔVp≤0.

The target direct voltage command Vcu outputted from the target direct voltage command generating section 501 is inputted to the electrical-angle synchronized voltage command generating section 303 and the determination section 505. Further, the electrical-angle synchronized voltage command Vcu* generated by the electrical-angle synchronized voltage command generating section 303 is inputted to the determination section 505. The determination section 505 outputs the target direct voltage command Vcu or alternatively the electrical-angle synchronized voltage command Vcu* depending on the result of comparison between the minimum value (Vcu*min) of the electrical-angle synchronized voltage command Vcu* whose amplitude ripples in synchronization with the change of the electrical angle θm of the rotator of the electric motor 10 and the battery voltage Vb of the condenser 15. That is, the determination section 505 outputs the target direct voltage command Vcu when Vcu*min≤Vb, and outputs the electrical-angle synchronized voltage command Vcu* when Vcu*min>Vb. The target direct voltage command Vcu or alternatively the electrical-angle synchronized voltage command Vcu* outputted from the determination section 505 is inputted to the DC-DC converter 223.

In the control apparatus for the electric motor 10 according to the present embodiment described above, the DC-DC converter 223 of step-up type operates in accordance with the target direct voltage command Vcu or alternatively the electrical-angle synchronized voltage command Vcu*. When Vcu*min is greater than Vb (Vcu*min>Vb), it is sufficient that the DC-DC converter 223 performs step-up alone. Thus, the DC-DC converter 223 can appropriately respond to the electrical-angle synchronized voltage command Vcu*. On the other hand, when Vcu*min is smaller than or equal to Vb (Vcu*min≤Vb), the DC-DC converter 223 cannot appropriately respond to the electrical-angle synchronized voltage command Vcu*. Thus, when Vcu*min is smaller than or equal to Vb, the DC-DC converter 223 operates in accordance with the target direct voltage command Vcu so as to output a voltage which is greater than or equal to the battery voltage Vb and has no ripple in the amplitude.

Thus, even in the DC-DC converter 223 of step-up type, when Vcu***min is greater than Vb, an effect similar to that of the first embodiment is obtained. Here, the second to the fourth embodiments may be applied to the control apparatus for the electric motor 10 according to the present embodiment.

In a case that the control apparatus for the electric motor according to the above-mentioned embodiments is mounted on a vehicle and that the electric motor 10 is provided for the purpose of driving of the vehicle so that noise and vibration of the electric motor 10 is reduced by the torque ripple reduction in the electric motor 10, drivability is improved.

The present invention has been described above in detail with reference to particular embodiments. It is clear for the person skilled in the art that various kinds of modifications and corrections may be made without departing from the spirit and the scope of the present invention.

The present application is based on a Japanese patent application (Japanese Patent Application No. 2009-050255) filed on Mar. 4, 2009. The contents thereof are incorporated herein by reference.

DESCRIPTION OF REFERENCE NUMERALS 10 electric motor
11 rotator
13 stator
15 condenser
101 resolver
103 current sensor
105 band pass filter (BPF)
107 three-phase-dq conversion section
109 current command calculating section
111 d-axis current control section
113 q-axis current control section
115 rθ conversion section
117 inverter (INV)
119 angular velocity calculating section
123, 223 DC-DC converter
125 output voltage detecting section
127 inverter control method determining section
151, 161, 171, 181, 191 output voltage command generating section
153 output current detecting section
201 maximum voltage circle calculating section
203 output voltage circle calculating section
205 switching flag output section
301, 501 target direct voltage command generating section
303, 403 electrical-angle synchronized voltage command generating section
163 phase voltage detecting section
165 phase voltage cross point detecting section
173 phase estimation section
193 battery voltage detecting section
505 determination section

The invention claimed is:

1. A control apparatus for an electric motor provided with a rotator having a permanent magnet and with a stator for generating a rotating magnetic field by an applied voltage and revolving the rotator, the control apparatus comprising:
 a rectangular wave inverter that applies a rectangular wave voltage onto the stator of the electric motor to drive the electric motor;
 a voltage converting section that raises or lowers an output voltage of a direct-current power supply and applies the voltage onto the rectangular wave inverter;
 an electrical angle acquiring section that acquires an electrical angle of the rotator of the electric motor; and
 an output voltage command generating section that generates a command for instructing the voltage converting section to output an electrical-angle synchronized voltage whose amplitude ripples in synchronization with a change of the electrical angle of the rotator acquired by the electrical angle acquiring section,
 wherein, in response to the command generated by the output voltage command generating section, the voltage converting section raises or lowers the output voltage of the direct-current power supply to a voltage indicated by the command and applies the voltage onto the rectangular wave inverter, and
 wherein an average of the electrical-angle synchronized voltage is a value acquired in correspondence to a difference between a required output power derived based on a torque required for the electric motor and an angular velocity of the rotator and an actual output power derived based on the output voltage and the output current of the voltage converting section.

2. The control apparatus for the electric motor according to claim 1 wherein
 the rectangular wave inverter applies multi-phase rectangular wave voltages onto the stator, and
 a ripple pattern indicated by the command generated by the output voltage command generating section is such a waveform that the amplitude of the electrical-angle synchronized voltage varies with a period defined as a predetermined amount of change of the electrical angle and that the electrical-angle synchronized voltage has the maximum at electrical angles where any one of absolute values of the multi-phase rectangular wave voltages has the maximum.

3. The control apparatus for the electric motor according to claim 2, wherein
 the voltage converting section is a step-up type voltage converting section for raising the output voltage of the direct-current power supply and applying the voltage onto the rectangular wave inverter,
 the output voltage command generating section outputs the command for instructing the voltage converting section to output the electrical-angle synchronized voltage when the minimum value of the electrical-angle synchronized voltage is greater than the output voltage of the direct-current power supply, and outputs a command for instructing the voltage converting section to output a fixed voltage when the minimum value of the electrical-angle synchronized voltage is smaller than or equal to the output voltage of the direct-current power supply, and
 in response to a command outputted by the output voltage command generating section, the voltage converting section raises the output voltage of the direct-current power supply to a voltage indicated by the command and applied the voltage onto the rectangular wave inverter.

4. The control apparatus for the electric motor according to claim 2, wherein
 the voltage converting section is a step-up type voltage converting section for raising the output voltage of the direct-current power supply and applying the voltage onto the rectangular wave inverter,
 the output voltage command generating section outputs the command for instructing the voltage converting section to output the electrical-angle synchronized voltage when the minimum value of the electrical-angle synchronized voltage is greater than the output voltage of the direct-current power supply, and outputs a command for instructing the voltage converting section to output a fixed voltage when the minimum value of the electrical-angle synchronized voltage is smaller than or equal to the output voltage of the direct-current power supply, and in response to a command outputted by the output voltage command generating section, the voltage converting section raises the output voltage of the direct-current power supply to a voltage indicated by the command and applies the voltage onto the rectangular wave inverter.

5. The control apparatus for the electric motor according to claim 1, wherein the voltage converting section is a step-up type voltage converting section for raising the output voltage of the direct-current power supply and applying the voltage onto the rectangular wave inverter, the output voltage command generating section outputs the command for instructing the voltage converting section to output the electrical-angle synchronized voltage when the minimum value of the electrical-angle synchronized voltage is greater than the output voltage of the direct-current power supply, and outputs a command for instructing the voltage converting section to output a fixed voltage when the minimum value of the electrical-angle synchronized voltage is smaller than or equal to the output voltage of the direct-current power supply, and in response to a command outputted by the output voltage command generating section, the voltage converting section raises the output voltage of the direct-current power supply to a voltage indicated by the command and applies the voltage onto the rectangular wave inverter.

6. The control apparatus for the electric motor according to claim 1, wherein the voltage converting section is a step-up type voltage converting section for raising the output voltage of the direct-current power supply and applying the voltage onto the rectangular wave inverter, the output voltage command generating section outputs the command for instructing the voltage converting section to output the electrical-angle synchronized voltage when the minimum value of the electrical-angle synchronized voltage is greater than the output voltage of the direct-current power supply, and output a command for instructing the voltage converting section to output a fixed voltage when the minimum value of the electrical-angle synchronized voltage is smaller than or equal to the output voltage of the direct-current power supply, and in response to a command outputted by the output voltage command generating section, the voltage converting section raises the output voltage of the direct-current power supply to a voltage indicated by the command and applies the voltage onto the rectangular wave inverter.

7. A control apparatus for an electric motor provided with a rotator having a permanent magnet and with a stator for generating a rotating magnetic field by an applied voltage and revolving the rotator, the control apparatus comprising:

a rectangular wave inverter for applying a rectangular wave voltage onto the stator of the electric motor so as to drive the electric motor;

a voltage converting section that raises or lowers an output voltage of a direct-current power supply and applied the voltage onto the rectangular wave inverter;

an angular velocity acquiring section that acquires an angular velocity of the rotator of the electric motor; and an output voltage command generating section that generates a command for instructing the voltage converting section to output an electrical-angle synchronized voltage whose amplitude ripples in synchronization with a change of the rectangular wave voltage applied onto the stator, wherein, in response to the command generated by the output voltage command generating section, the voltage converting section raises or lowers the output voltage of the direct-current power supply to a voltage indicated by the command and applied the voltage onto the rectangular wave inverter, and wherein an average of the electrical-angle synchronized voltage is a value acquired in correspondence to a difference between a required output power derived based on a torque required for the electric motor and an angular velocity of the rotator and an actual output power derived based on the output voltage and the output current of the voltage converting section.

8. The control apparatus for the electric motor according to claim 7, wherein the voltage converting section is a step-up type voltage converting section for raising the output voltage of the direct-current power supply and applying the voltage onto the rectangular wave inverter, the output voltage command generating section outputs the command for instructing the voltage converting section to output the electrical-angle synchronized voltage when the minimum value of the electrical-angle synchronized voltage is greater than the output voltage of the direct-current power supply, and outputs a command for instructing the voltage converting section to output a fixed voltage when the minimum value of the electrical-angle synchronized voltage is smaller than or equal to the output voltage of the direct-current power supply, and in response to a command outputted by the output voltage command generating section, the voltage converting section raises the output voltage of the direct-current power supply to a voltage indicated by the command and applies the voltage onto the rectangular wave inverter.

9. The control apparatus for the electric motor according to claim 7, wherein the rectangular wave inverter applied multi-phase rectangular wave voltages onto the stator, and a ripple pattern indicated by the command generated by the output voltage command generating section is such a waveform that the maximum of the electrical-angle synchronized voltage corresponds to electrical angles where any two phase voltages among the multi-phase rectangular wave voltages have the same value.

10. The control apparatus for the electric motor according to claim 9, wherein the voltage converting section is a step-up type voltage converting section for raising the output voltage of the direct-current power supply and applying the voltage onto the rectangular wave inverter, the output voltage command generating section outputs the command for instructing the voltage converting section to output the electrical-angle synchronized voltage when the minimum value of the electrical-angle synchronized voltage is greater than the output voltage of the direct-current power supply, and outputs a command for instructing the voltage converting section to output a fixed voltage when the minimum value of the electrical-angle synchronized voltage is smaller than or equal to the output voltage of the direct-current power supply, and in response to a command outputted by the output voltage command generating section, the voltage converting section raises the output voltage of the direct-current power supply to a voltage indicated by the command and applies the voltage onto the rectangular wave inverter.

11. The control apparatus for an electric motor according to claim 7, wherein the rectangular wave inverter applies multi-phase rectangular wave voltages onto the stator, and a ripple pattern indicated by the command generated by the output voltage command generating section is such a waveform that the maximum of the electrical-angle synchronized voltage corresponds to electrical angles where any one phase voltage among the multi-phase rectangular wave voltages becomes 0.

12. The control apparatus for the electric motor according to claim 11, wherein the voltage converting section is a step-up type voltage converting section for raising the output voltage of the direct-current power supply and applying the voltage onto the rectangular wave inverter, the output voltage command generating section outputs the command for instructing the voltage converting section to output the electrical-angle synchronized voltage when the minimum value of the electrical-angle synchronized voltage is greater than the output voltage of the direct-current power supply, and outputs a command for instructing the voltage converting section to output a fixed voltage when the minimum value of the electrical-angle synchronized voltage is smaller than or equal to the output voltage of the direct-current power supply, and in response to a command outputted by the output voltage command generating section, the voltage converting section raises the output voltage of the direct-current power supply to a voltage indicated by the command and applies the voltage onto the rectangular wave inverter.

* * * * *